United States Patent [19]

Davis, Jr. et al.

[11] 4,236,233
[45] Nov. 25, 1980

[54] INTERACTIVE MULTIDIMENSIONAL CLASSIFICATION AND SORTING OF SEISMIC SEGMENT DATA

[75] Inventors: Robert S. Davis, Jr.; William A. Schneider, both of Dallas, Tex.

[73] Assignee: Texas Instruments Incorporated, Dallas, Tex.

[21] Appl. No.: 214,188

[22] Filed: Dec. 30, 1971

[51] Int. Cl.$^3$ .............................................. G01V 1/34
[52] U.S. Cl. ....................................... 367/71; 367/38; 346/33 C
[58] Field of Search ................ 340/15.5 DS, 15.5 DP; 346/33 C; 367/71, 38

[56] References Cited

U.S. PATENT DOCUMENTS

| | | | |
|---|---|---|---|
| 3,268,857 | 8/1966 | Robinson | 340/15.5 DS |
| 3,651,451 | 3/1972 | Ruehle | 340/15.5 DS |
| 3,668,618 | 6/1972 | Quay | 340/15.5 DS |
| 3,681,748 | 8/1972 | Diltz | 340/15.5 DS |

OTHER PUBLICATIONS

IBM form A27-2702-0, IBM 360 component description; IBM 2250 display unit model 2, IBM 2840 display control model 1.
*Computer Graphics in Geophysics*, Smith et al., *Geophysics*, vol. 37, No. 5, Oct. 1972, pp. 825-838.
Grafacon Tablet, model 1010A, specifications, Bolt, Beranek & Newman Inc.

*Primary Examiner*—Howard A. Birmiel
*Attorney, Agent, or Firm*—Leo M. Heiting; Melvin S. Sharp; N. Rhys Merrett

[57] ABSTRACT

The specification discloses a method and system wherein an operator interacts with an automatic data processing and display system to classify and sort subsurface reflective surfaces or segments in a multidimensional context. The technique utilizes a properly programmed general purpose digital computer in combination with a plurality of storage tube display screens. Seismic reflection data in the form of computer picked reflection segments, hereinafter referred to as seismic segment data, produced from previous computer processing steps is entered into the computer. Displays of the velocity, amplitude, dip and length of the segments in a space gate are then provided on the display screens. A data responsive surface having a network of conductive wires and a detecting stylus are utilized by the operator to operate upon the displayed segment data to classify primary segments and to define boundaries relative to each of the parameter displays. The computer sorts the data according to the defined boundaries and segments are displayed which meet the defined boundary conditions. Provision is made to enable easy alteration of the displayed segment parameters and designated boundaries.

24 Claims, 28 Drawing Figures

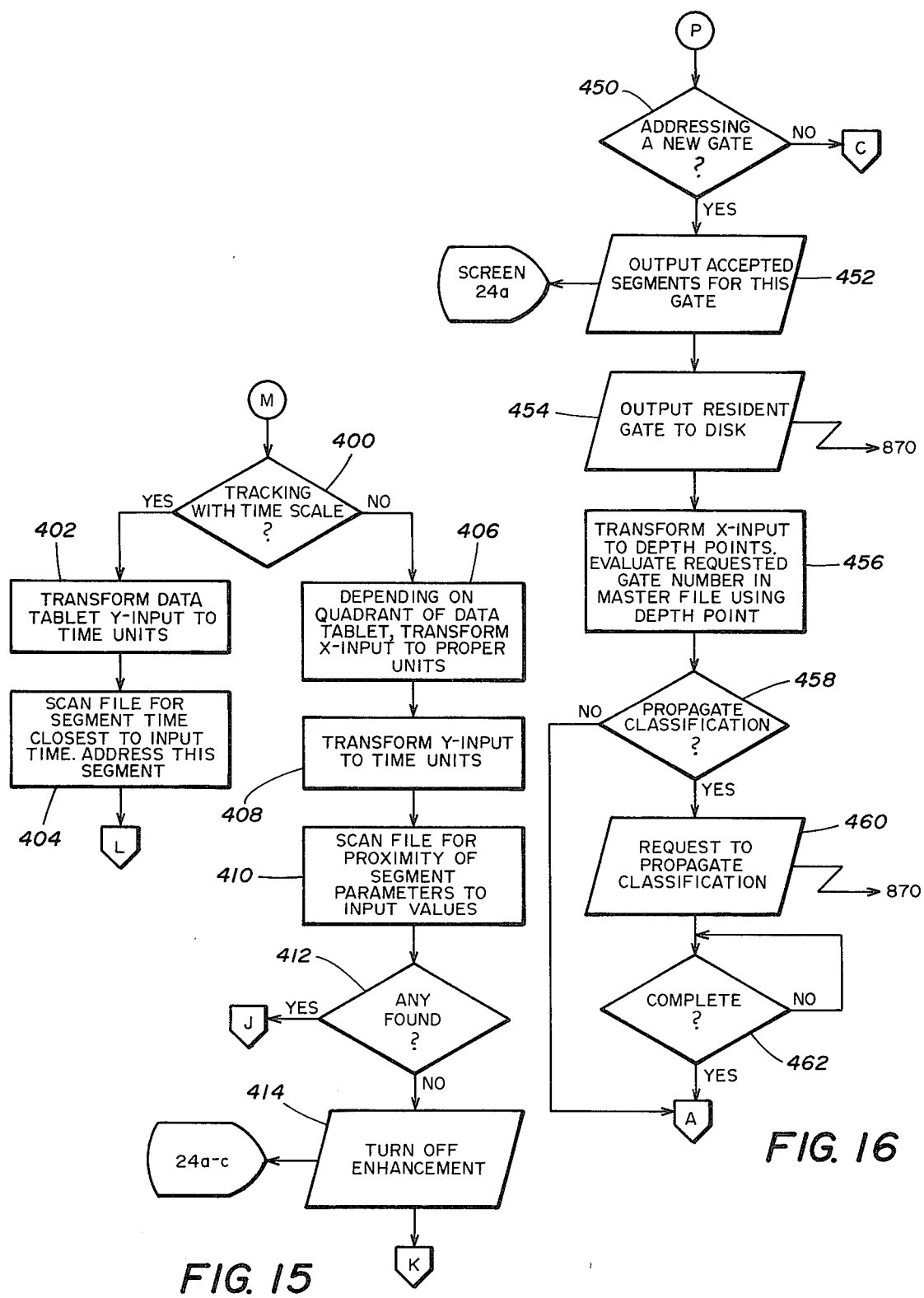

INTERACTIVE MULTIDIMENSIONAL CLASSIFICATION AND SORTING OF SEISMIC SEGMENT DATA

FIELD OF THE INVENTION

This invention relates to a method and apparatus for processing seismic data, and more particularly relates to a method and system for interaction with an operator to classify and sort apparent subsurface reflective segments.

THE PRIOR ART

In conventional processing of seismic exploration data, as for example with the use of the 600/700 Package Processing technique presently known and used in the industry as a service available from Geophysical Service Inc., described in the publication entitled "600 Package Processing Examples" dated July 1970 seismic segment data is generated. This seismic segment data exists over a number of depthpoints, or lateral units of variation along the earth's surface, and exhibits a number of variable parameters. To facilitate the handling of data, the processed seismic line is usually divided into "space gates" over which a segment for a given gate may be expressed as a function of a single travel time at the center of a space gate, dip which is a variation of travel time as a function of depthpoint, RMS velocity averaged within the space gate, seismic wavelet amplitude and total segment length in terms of the number of depthpoints the segment spans.

Generally, erroneous or false segments are present in the seismic segment data produced from conventional digital processing. The segment errors generally arise from noise during the data collection phase of the operation, picking errors during processing or multiples caused by extraneous reflections or the like. It has thus been heretofore known to examine the segments generated by conventional processing in the context of the variables of the segment within each gate in order to attempt to eliminate segments having anomalous parameter values and obtain a more accurate representation of the subsurface geology. Elimination of such segment anomalies has generally been heretofore accomplished by sorting of the segments in a batch mode of processing. For example, boundaries have been defined on a segment graph with the use of film or an X-Y plotter. A computer is then operated to generate a display showing which points on the graph have been accepted. Such batch processing operations are laborious and time consuming, and the boundaries cannot be redefined without running the entire sorting program again. In addition, such previously developed batch sorting techniques generally have not been capable of simultaneously sorting according to boundaries in velocity, depth, amplitude and length in order to provide an accurate indication of segment sets.

SUMMARY OF THE PRESENT INVENTION

In accordance with the present invention, a seismic segment data interpretation system includes displays for visually displaying a plurality of parameters of seismic segment data as a function of time. An operator defines parameter boundaries on the displays, with indications being provided on the displays of which of the parameter data meets the defined boundary conditions.

In accordance with another aspect of the invention, a system for interpreting seismic segment data includes displays for displaying seismic segments within a space gate. Screens are provided to display parameters of the seismic segments including the RMS velocity as a function of time. Classification means is provided for designation of ones of the segments as primary seismic segments. An automatic data processor then automatically computes and displays the interval velocities of the primary seismic segments.

In accordance with a more specific aspect of the invention, a system for processing seismic segment data includes a data responsive surface for receiving a graph of seismic data over a plurality of space gates. A stylus is movable by an operator relative to the data responsive surface for generation of electrical signals indicative of the position of the stylus on the data responsive surface. A plurality of display screens are provided to display to the operator representations of segments within a selected one of the space gates and a plurality of parameters of the segments. Means is provided which is responsive to positioning of the stylus for defining on the displays boundaries for selected ones of the parameters. Means is then provided for indicating on the displays which of the segments and parameters meet the conditions of the defined boundaries.

In accordance with yet another aspect of the invention, a system is provided for interaction with an operator to classify the sort seismic segment data. A data responsive surface receives a graph of seismic segment data on time-depthpoint coordinates. A stylus is movable by the operator adjacent the graph, and circuitry is associated with the data responsive surface and the stylus for generating electrical signals representative of the location of the stylus relative to the graph. A plurality of display screens are arranged for viewing by the operator. An automatic data processing machine is interconnected between the stylus, the data responsive surface and the display screens. Function keys are operable by the operator to display on the display screens representations of seismic segments within a selected space gate of the graph and representations of the velocity, amplitude, length, and dip parameters of the seismic segments within the selected space gate. Classification means is responsive to movement of the stylus relative to the graph for displaying on the display screens indications of primary segments. Circuitry is responsive to movement of the stylus relative to the graph for displaying boundaries on selected ones of the displayed parameters. The automatic data processing machine is operable to sort the seismic segments and the seismic parameters according to the boundaries and to display on the display screens which of the seismic segments and parameters meet the conditions of the boundaries.

In accordance with another aspect of the invention, a method of seismic segment processing includes displaying a plurality of parameters of seismic segment data as a function of time. Parameter boundaries are then defined on the displays of parameters, and the parameters which meet the defined boundary conditions are indicated on a substantially real time basis.

In accordance with yet another aspect of the invention, a method for interacting with an operator to process seismic segment data includes displaying representations of seismic segments within a selected space gate. Representations are also displayed of the velocity, amplitude, length and dip parameters of the seismic segments within the space gate. Boundaries are then displayed on selected ones of the parameter displays. The method further includes displaying on a substantially real time basis which of the segments and the parameters meet the boundary conditions, as well as displaying seismic segments for a plurality of adjacent space gates which meet defined boundary conditions.

DESCRIPTION OF THE DRAWINGS

For a more detailed explanation of the present invention, and for further objects and advantages thereof, reference is now made to the following description, taken in conjunction with the accompanying drawings, in which:

FIGS. 9-16 are functional flow diagrams of subroutines comprising the program for the digital computer of the present system.

DESCRIPTION OF THE PREFERRED EMBODIMENT

Figure 1:
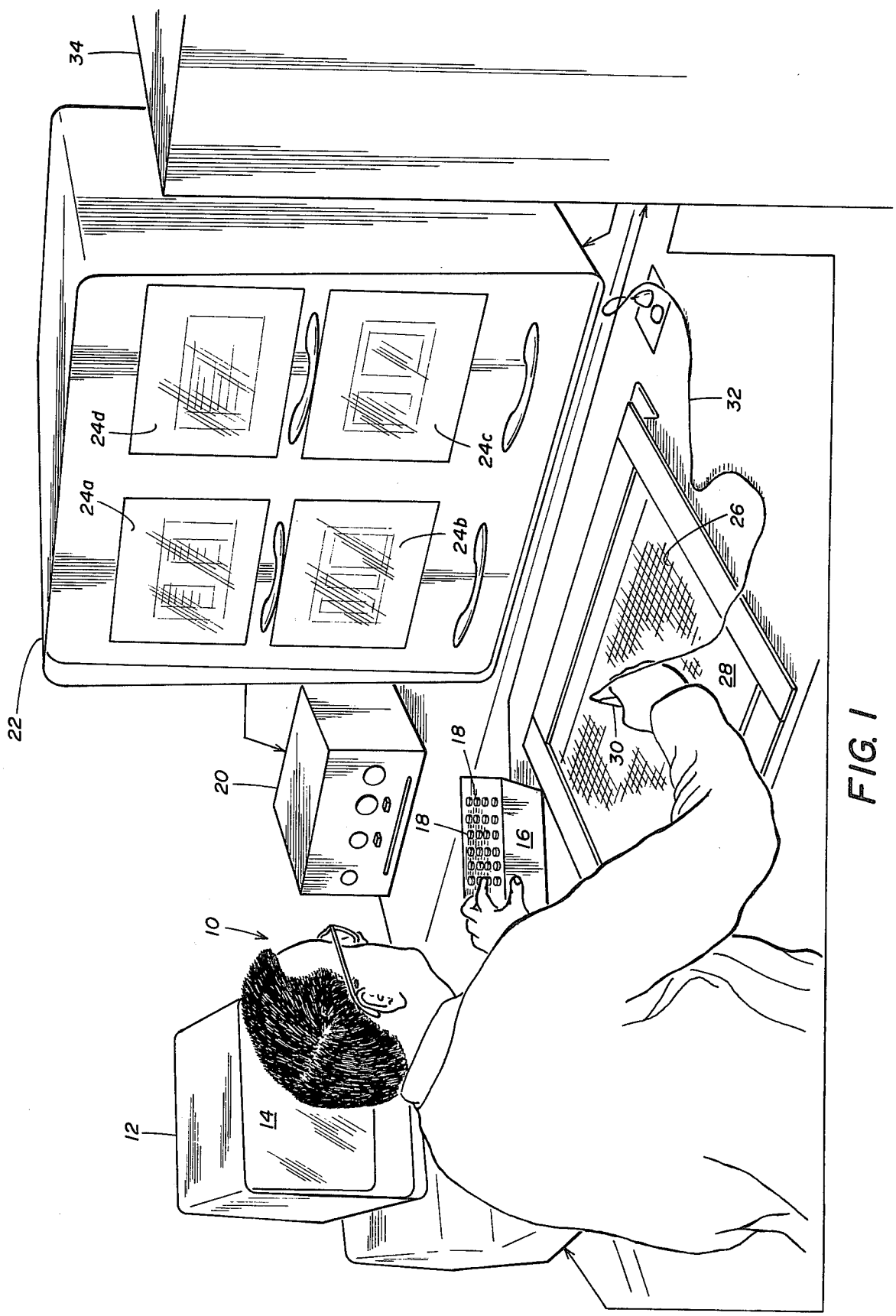
FIG. 1 illustrates a perspective view of the present system during operation.

FIG. 1 illustrates the basic system components embodied in the present system. An operator 10 skilled in the interpretation of seismic data is positioned facing a plurality of instruments including a conventional teletype machine 12 including a visual readout screen 14. A suitable teletype for use with the invention is manufactured and sold by Computek, Inc. A function key set 16 includes a plurality of function key buttons 18 which may be manually depressed by the operator 10 to initiate automatic performance of various functions to be later described, such as varying the content of selected displays of the system. A reproducing machine 20 is interconnected with the system to provide permanent copies of various velocity file displays upon demand by the operator 10. A suitable reproducing machine comprises the Model 4601 machine manufactured and sold by Tektronik, Inc. A display unit 22 includes four Computek Model 430 storage tube display screens 24a–d upon which are displayed various functions during the operation of the system.

A data responsive surface 26 is disposed on the table in front of the operator 10 for receiving a seismic data graph 28 to be interpreted. In the preferred embodiment, the graph 28 comprises a segment graph having time-depthpoint coordinates. The depthpoint coordinates generally encompass a plurality of space gates taken along a seismic survey line. Such graphs are commonly termed "VAR sections", and are derived from conventional seismic prospecting and processing techniques. The data responsive surface 26 in the preferred embodiment comprises a plastic surface overlaying an X-Y network of conductive wires, not shown. A stylus 30 connected by an electric cord 32 is held by the operator 10 and is moved adjacent the location of selected seismic data points to provide selected displays upon the display unit 22. In the preferred embodiment, the stylus 30 senses an electric field which is generated by the network of conductive wires, and circuitry associated with the data responsive surface 26 generates electrical signals representative of the position of the stylus 30 relative to the graph 28. A suitable data responsive surface for use with the invention comprises a system manufactured and sold under the tradename "Model 2020 Data Tablet" by Bolt, Beranek, & Newman, Inc.

An automatic data processor or computer 34 is interconnected with the various components of the system illustrated in FIG. 1 to interact with the operator 10 to provide meaningful displays of seismic data upon the display screens 24a–d. In the preferred embodiment, the computer 34 comprises a properly programmed SEL 810A computer manufactured and sold by Systems Engineering Laboratories, of Ft. Lauderdale, Florida. In order to supply needed storage and processing capability, an 870 TIAC computer manufactured by Texas Instruments Incorporated of Dallas, Texas, is utilized in tandem with the SEL 810A in the preferred embodiment. However, other digital computers could of course be utilized. Prior to use, the computer 34 receives and stores segment data previously developed by such processes as the 600/700 Package Processing presently available from Geophysical Service Inc. Computer 34 receives instructions from the operator entered through the teletype 12 and operates upon the stored segment data according to the electrical output signals generated by the data responsive surface 26. The seismic data resulting from the operations of the computer 34 is displayed upon the data display screens 24a–d, as will later be described. The operator 10 by operation of the function key set 16 may selectively vary any portion of the displays on screens 24a–d to provide a desired segment file. By operation of the reproducing machine 20, the operator 10 is then provided with a permanent record of the segment file determined by operation of the system.

Briefly, the operation of the system shown in FIG. 1 is initiated by the operator 10 by positioning the graph 28 upon the data responsive surface 26 and by setting up the system for operation by the use of the teletype 12. As previously noted, the graph 28 may comprise any suitable segment graph having timedepthpoint coordinates divided up into a plurality of space gates. Parameter data for the particular segment graph has previously been entered into the computer 34. Such parameter data is obtained from such processing techniques as the 600/700 Processing Packages previously identified.

Normally, the parameter data for the graph 28 which is entered into the computer 34 will include RMS velocity averaged within each space gate, wavelet amplitude, total segment length as the total number of depthpoints the segment spans, and dip comprising a variation of travel time as a function of depthpoint.

Prior to operation of the present invention, the segment data contained upon graph 28 will generally include errors which arise generally from picking errors during processing or noise which occurs during the data collecting phase of the operation. In accordance with the present invention, the collection of the segments on graph 28 are examined in the context of each of the above-noted parameter variables within each space gate, so that the seismic segments with anomalous parameter values may be eliminated. The resulting set of seismic data provided by the present invention will then enable the operator 10 to obtain a more accurate representation of the subsurface geology.

Prior to the operation of the present system, the necessary disc files have been created within the 810A and 870 computers. In the preferred embodiment, up to thirty gate files will then exist on the disc file for each seismic line to be processed. Thus, for a 360 depthpoint line, thirty gates will be yielded each of which is twelve depthpoints wide. All segments the operator may use are contained in at least one gate file, and the information contained for each segment includes current classification, identifier, time, velocity, amplitude, segment length, starting depthpoint relative to the gate, and dip. Each segment is uniquely identified at least within each gate and the segments within each gate file are time sorted. All seismic segments in a previously unworked file are classified as "unclassified", while certain segments in a previously worked file may be classified as "classified". The gate files are filed in increasing depthpoint values and a general file exists giving a number of gates, the depthpoint extrema of each gate, and the number of words in each file resident on disk.

In operation of the present system, the graph 28 is placed upon the data responsive screen surface 26 and the system is energized. A selected gate file, in the manner to be subsequently described, is read from the 870 disc to the 810A SEL computer 34. During the time that the particular gate file is a terminal resident, the operator 10 is supplied with working displays on each of the display screens 24a–d. Typical displays which are initially displayed to the operator 10 on the screens 24a–d are shown in FIGS. 2a–d.

Figure 2A:
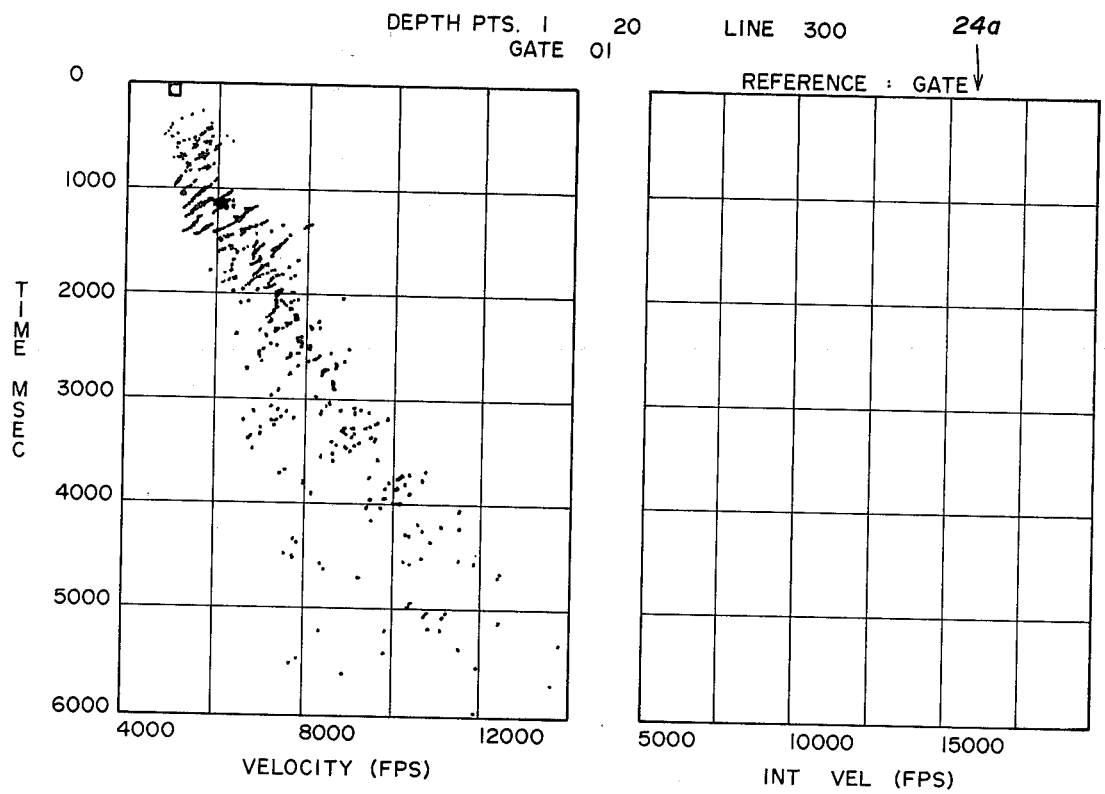
FIG. 2a illustrates the first display screen during initial operation of the system.

FIG. 2a illustrates display screen 24a, wherein a typical RMS velocity-time plot of all segments within the selected gate is shown. The RMS velocity points are plotted upon time coordinates in milliseconds versus velocity in feet per second. Additionally, a display is provided of interval velocity on a millisecond versus feet per second coordinate system. Interval velocity data is not shown in FIG. 2a, but is computed between selected segments, termed "Primary Segments", which are subsequently determined by the operator 10 in the manner to be subsequently described.

Figure 2B:
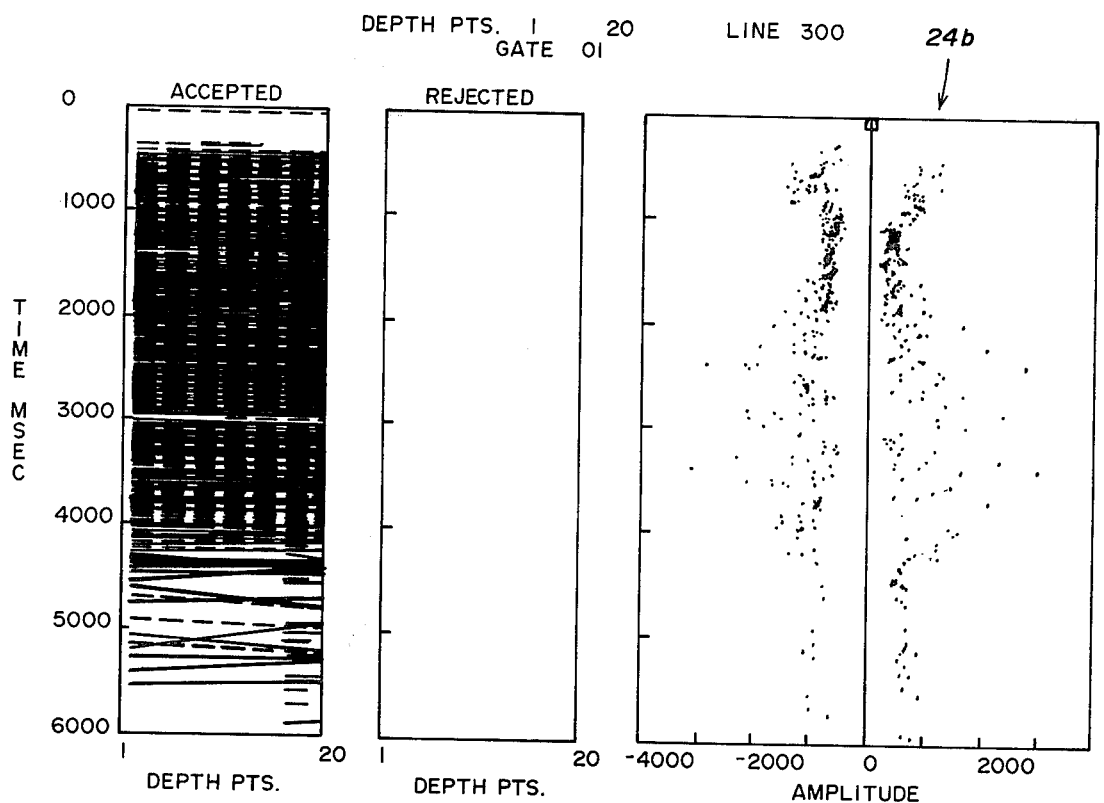
FIG. 2b illustrates the second display screen during initial operation of the system.

FIG. 2b illustrates the three displays presented on display screen 24b. The first display is the display of Accepted seismic segments plotted on time in milliseconds versus depthpoint coordinates. During the initial operation of the invention, all the seismic segments in the selected space gate will be initially displayed in the Accepted coordinate system. The peak segments from the VAR graph, which correspond with lineups of peaks on the original seismogram, are plotted as solid lines, while the trough segments representing trough lineups are plotted as dashed lines. The second portion of the display screen 24b comprises a display of the Rejected seismic segments of the space gate being operated upon. The rejected display is plotted on the same coordinate system as the Accepted seismic segment display. Also displayed on display screen 24b is a display of the segment amplitude. The central vertical axis of the amplitude display designates zero amplitude, with all data to the left of the central axis representing segment trough amplitude and all data to the right of the zero line representing segment peak amplitudes.

Figure 2C:
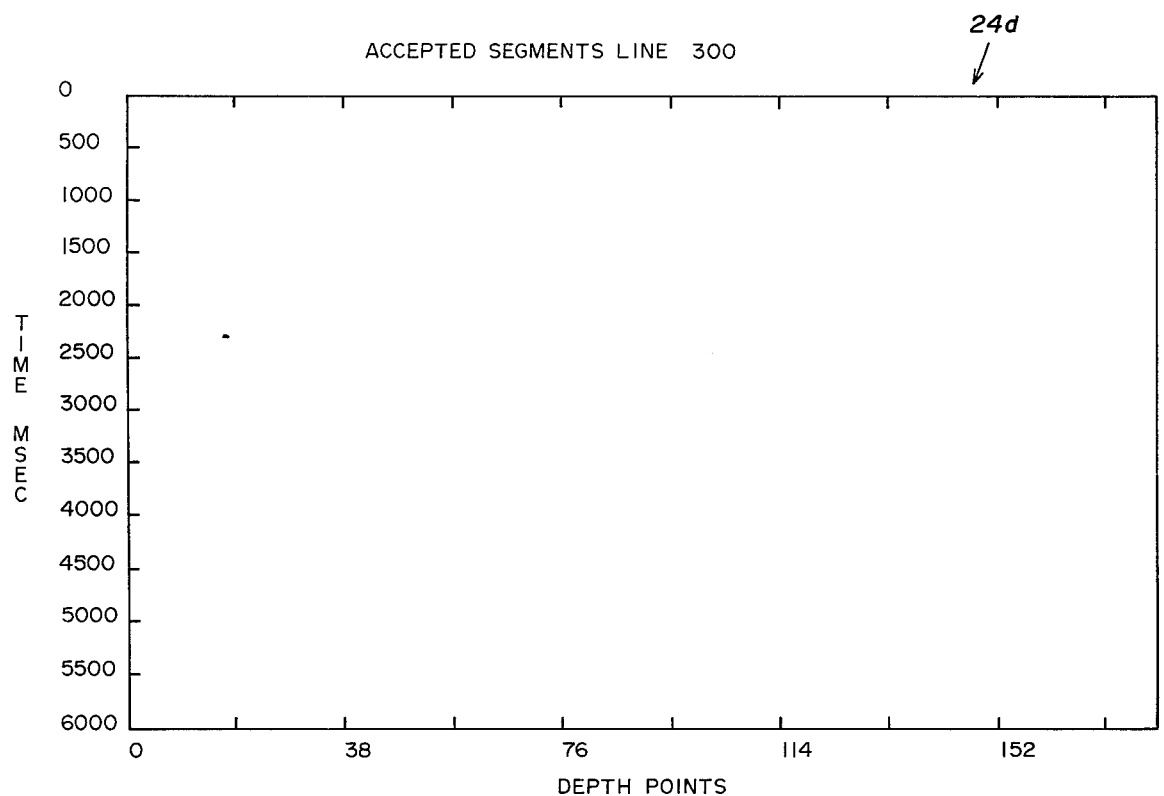
FIG. 2c illustrates the third display screen during initial operation of the system.

FIG. 2c illustrates the display on display screen 24d which comprises the current set of primary segments for the entire seismic line gate by gate. Upon initial operation of the system, the display on screen 24d will be blank, as no segments will have been classified or sorted at that time. Display screen 24d displays accepted segments on time in milliseconds versus depthpoint coordinates in order to indicate to the operator which of the gates have previously been sorted according to the invention.

Figure 2D:
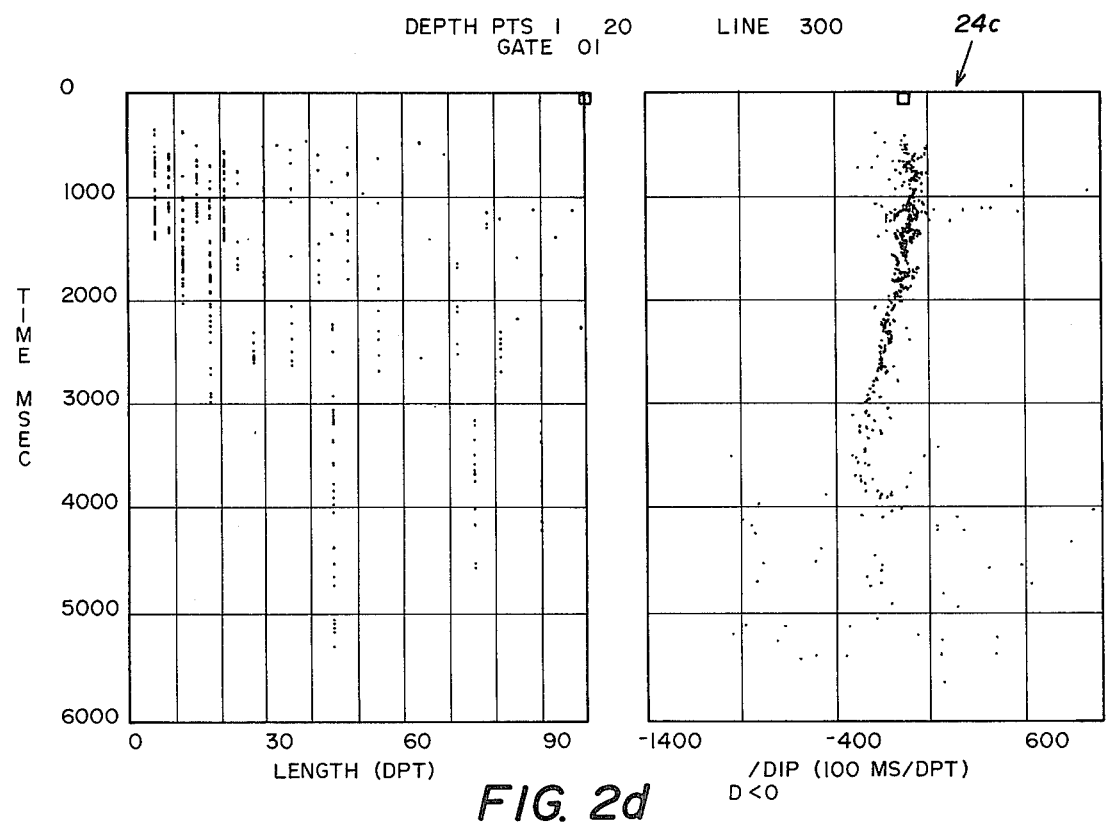
FIG. 2d illustrates the fourth display screen during initial operation of the invention.

In FIG. 2d, one-half of screen 24c displays data representing the length of the seismic segments versus time for the particular space gate being operated upon. The remaining half of the display screen 24c displays the dip on a time versus a ratio of milliseconds over depthpoints. It will thus be seen that the operator 10 upon initial operation of the system visually observes seismic segments in a selected space gate, along with a plurality of parameters of the seismic segments.

After the parameter data for the seismic segments are plotted on screens 24a–d, the operator begins to classify ones of the seismic segments as Primary Segments. This is accomplished by operating the function keys 18 to place the system in the Track mode. In this mode, the operator 10 places the tip of the stylus 30 on a seismic segment on the graph 28. The particular seismic segment being touched by the stylus 30 becomes enhanced or brighter upon the display screen 24b. In addition, the parameter points associated with the enhanced seismic segment become more brightly displayed on each of the parameter display screens 24a–c. The enhancement of the segment and the parameters enables the operator 10 to visually see how a particular seismic segment acts statistically with respect to the various parameters. In particular, the operator 10 inspects on screen 24a how the RMS velocity of the segment being enhanced acts statistically. If the RMS velocity of the enhanced segment acts substantially true, or is generally centered among the remaining RMS velocity points, the operator 10 may be generally satisfied that the enhanced seismic segment is a Primary Segment. Once the operator 10 is satisfied, he depresses a button 18 on the function key set 16 and each of the enhanced parameter points on the display screen 24a–c are changed to a square plotting symbol. Also at this time, an interval velocity for the chose Primary Segments is automatically plotted upon the display screen 24a.

Figure 3A:
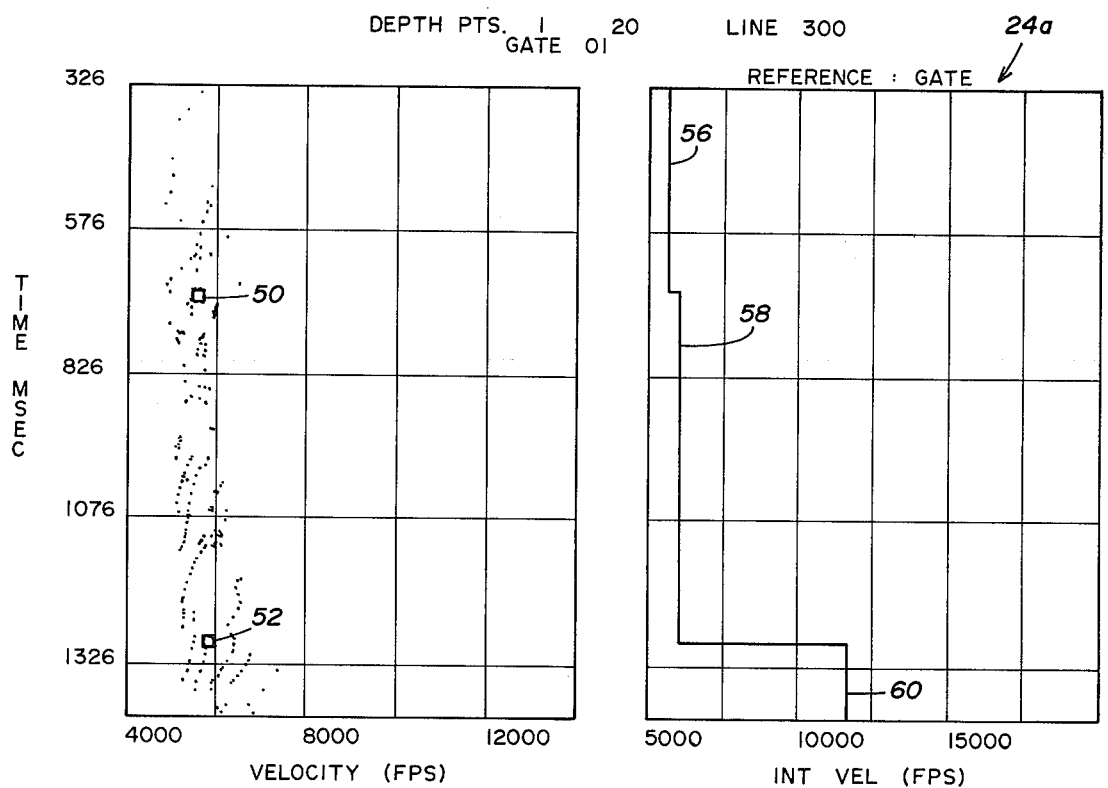
FIGS. 3a-b illustrate the first and second display screens during a zoom operation mode.
Figure 3B:
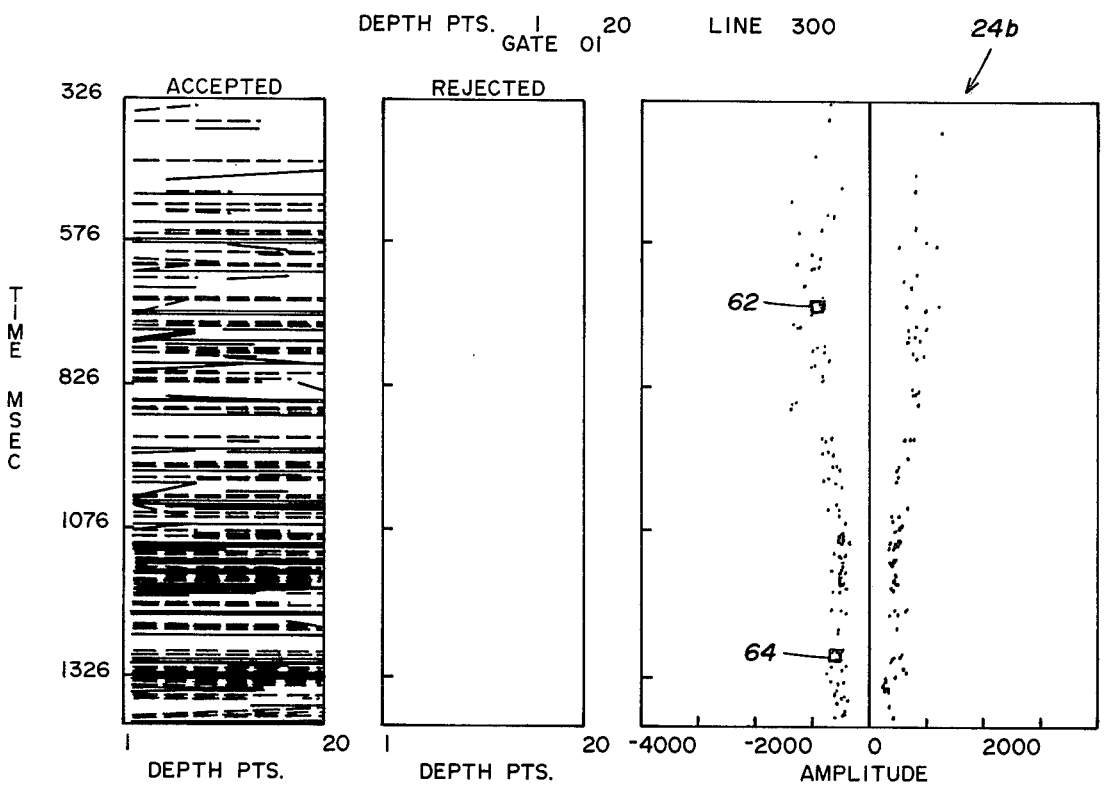

When in the Track mode of operation, it will often be desirable to "zoom" in or enlarge a selected portion of the displays in order to more accurately track a selected seismic segment. FIGS. 3a–b illustrate a typical use of the zoom feature of the present invention for display screens 24a–b. This zoom operation will also simultaneously occur on screens 24c–d. When it is desired to utilize the zoom feature of the invention, the operator operates the zoom function button on the function key set 16 and the operator 10 moves the stylus 30 to delineate the area of the graph 28 that he wants enlarged. The displays on the display screens are then erased and new time coordinates are plotted. In the examples shown in FIGS. 3a–b, the operator has designated the area between 326 milliseconds and approximately 1400 milliseconds as the area he desires to be enlarged. Thus, the seismic segments and the associated parameters lying within this time range are displayed on the screens.

It is possible to operate the system in the Track mode when the displays are zoomed as shown in FIGS. 3a–b. Thus, the operator may utilize the stylus 30 to enhance selected seismic segments shown on display screen 24b and to enhance corresponding parameter points on the remaining display screens. For example, as shown in FIG. 3a, a pair of square primary segment symbols 50 and 52 have been designated by the operator by the method previously described and displayed on the RMS velocity coordinates on the display screen 24a. Additionally, the system has automatically computed and displayed the interval velocities 56–60 on the display screen 24a which correspond with the interval velocities between the RMS breakpoints 50–52. Computation of the interval velocity is according to the well-known formula:

$$V_{ab} = \sqrt{\frac{V_b^2 t_b - V_a^2 t_a}{t_b - t_a}} \quad (1)$$

wherein
$V_{ab}$ = resulting interval velocity,
$V_a$ = RMS velocity at $t_a$, and
$V_b$ = RMS velocity at $t_b$.

Referring to FIG. 3b, amplitude points 62 and 64 are displayed on display screen 24b, the amplitude points being designated by the square symbol to indicate they correspond to a Primary Segment. It will thus be seen that the designation of a primary segment results in the display of square symbols 50 and 62 on display screens 24a–b and also results in the computation and display of the interval velocity 56 on the display screen 24a. The designation of a second primary seismic segment results in the display of the square parameter symbols 52 and 64, with subsequent computation and display of the interval velocity 58. Upon the designation of a primary segment, additional square symbols will be displayed on the display screen 24c in the length and dip domain displays.

In case the operator places the stylus 30 beyond the coordinates presently being displayed in the zoom operation of the system, the system automatically varies the display time range to encompass the point being touched by the operator. In this way, the system automatically compensates for tracking operation by the operator outside the designated zoomed time range.

Figure 4A:
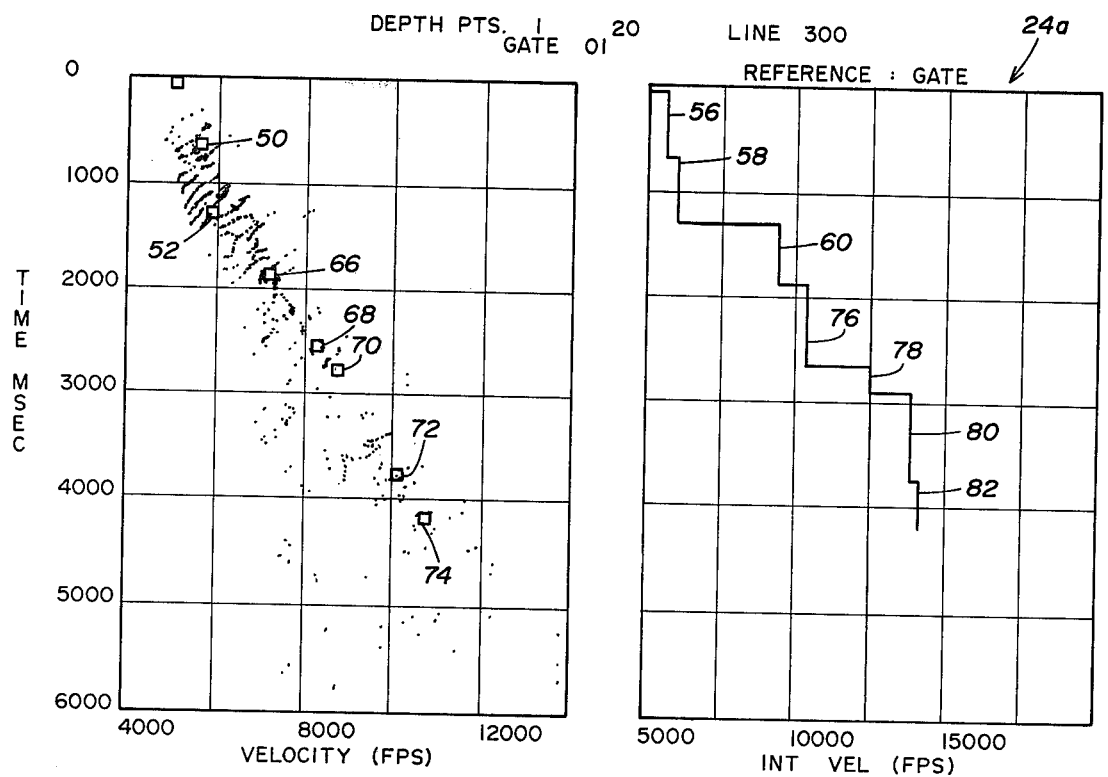
FIGS. 4a-c illustrate the first, second and third display screens of the invention after primary segments in a space gate have been picked by the operator.
Figure 4B:
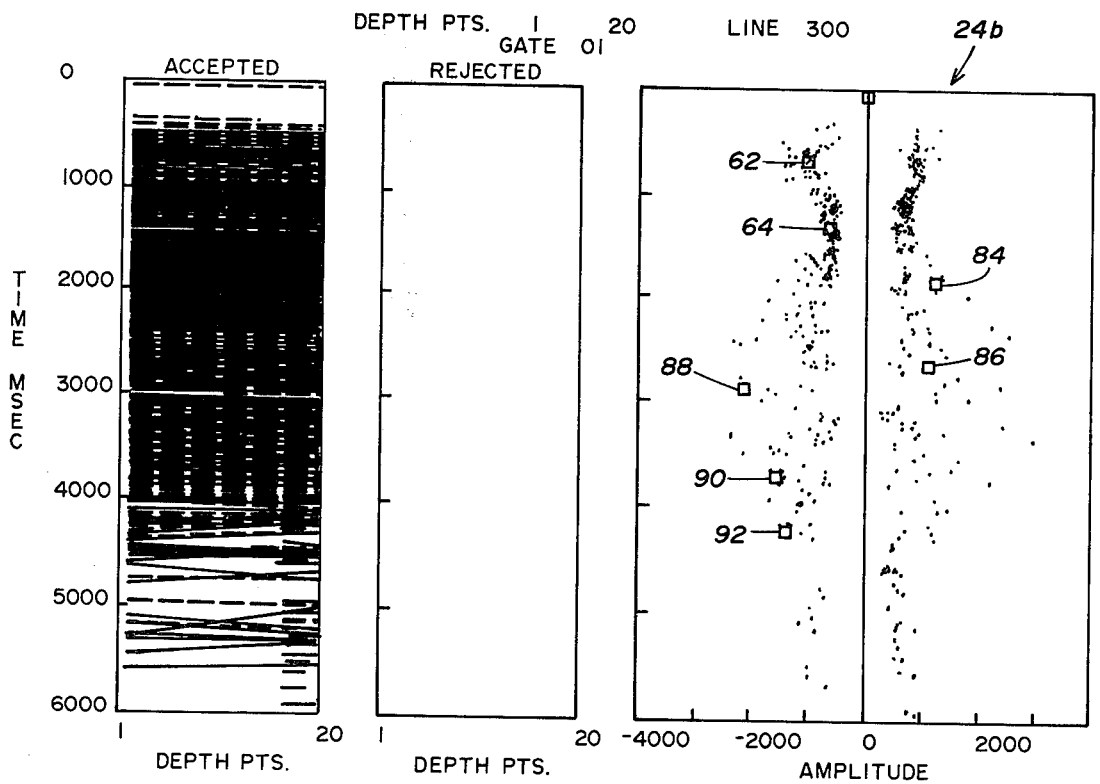
Figure 4C:
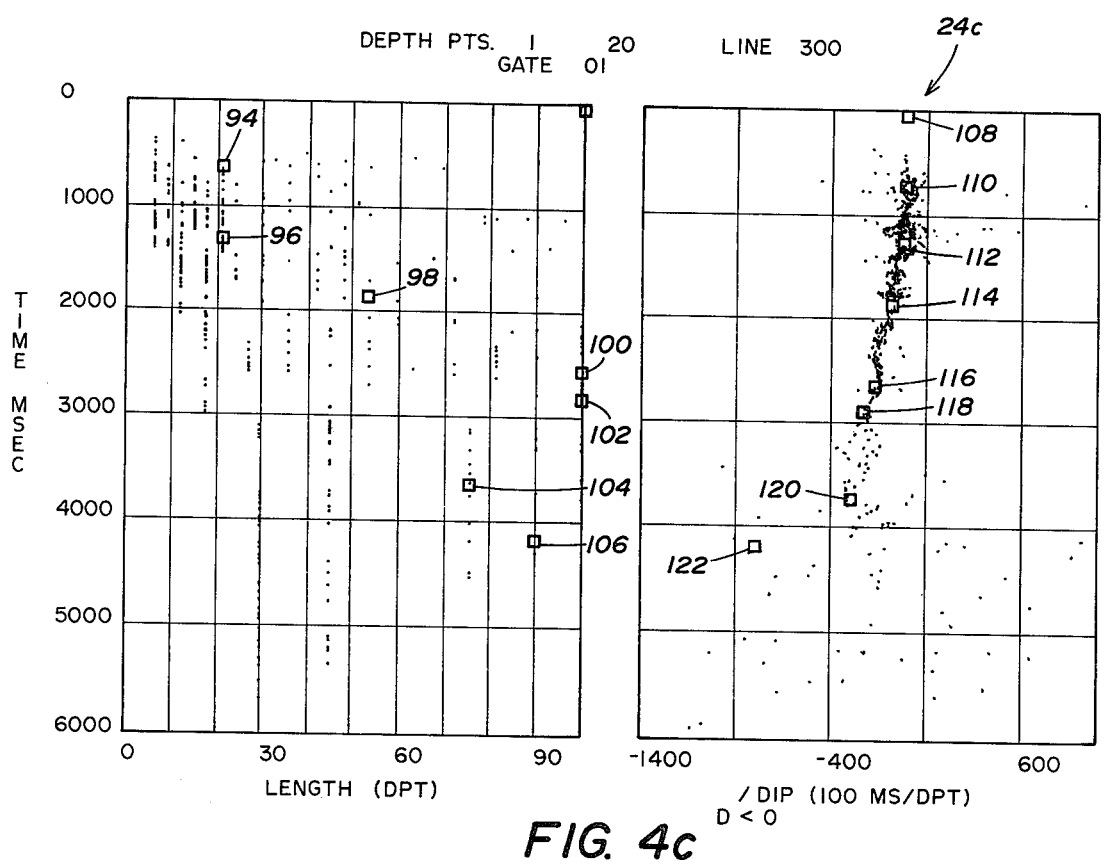

The operator continues selecting primary segments until he is satisfied with the displays. FIGS. 4a–c illustrate a typical completed display after the tracking mode of the invention. Screen 24d is not shown because at this stage in operation, the screen will be blank except for the coordinates. The displays shown in FIGS. 4a–c are no longer in the zoomed mode and thus correspond to FIGS. 2a–b and 2d with the exception that the primary segments have been visually indicated. For example, FIG. 4a illustrates the display screen 24a wherein breakpoints 50 and 52 previously discussed are illustrated. Similarly, interval velocities 56–60 previously described are again illustrated. In addition, additional RMS velocity breakpoints 66–74 have been picked by the operator, and thus interval velocities 76–82 have been automatically computed and plotted on display screen 24a.

Referring to FIG. 4b, amplitude data corresponding to the designated primary segments are illustrated by the square symbols 84–92. Referring to FIG. 4c, length data corresponding to the designated primary segments are indicated by the square symbols 94–106. Also referring to FIG. 4c, the display screen 24c illustrates dip data points corresponding to the designated primary segments by the square symbols 108–122. It will thus be apparent that as the operator picks each primary segment by movement of the stylus 30 relative to the graph 28, the operator is able to see on a substantially real time basis the corresponding parameters of that particular segment on display screens 24a–c. This enables the operator to more accurately pick the primary segment data as he is provided with a real time display of its effect on a plurality of related parameters. Also the operator is able to alter the selected primary segments at any time.

Figure 5A:
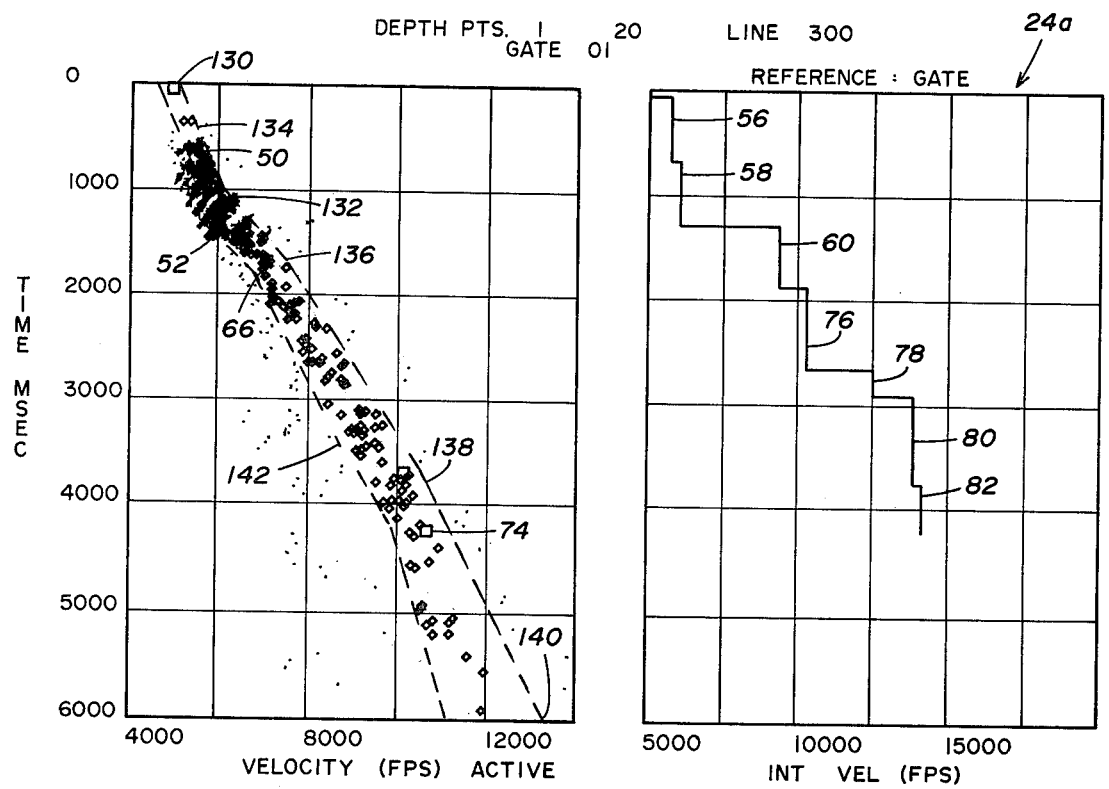
FIG. 5a-c illustrate the definition of a boundary on the first screen in the time-velocity domain and further illustrate the sorting of segment parameters with respect to defined boundaries on the first, second and third screens of the invention.
Figure 5B:
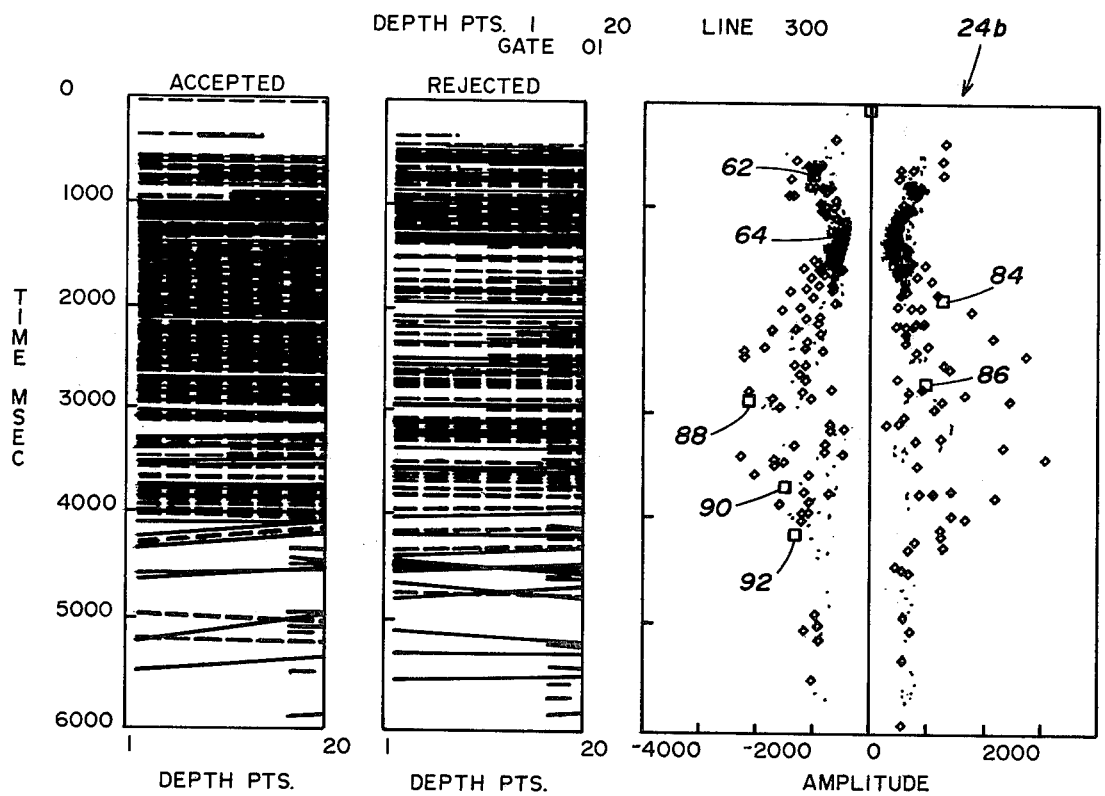
Figure 5C:
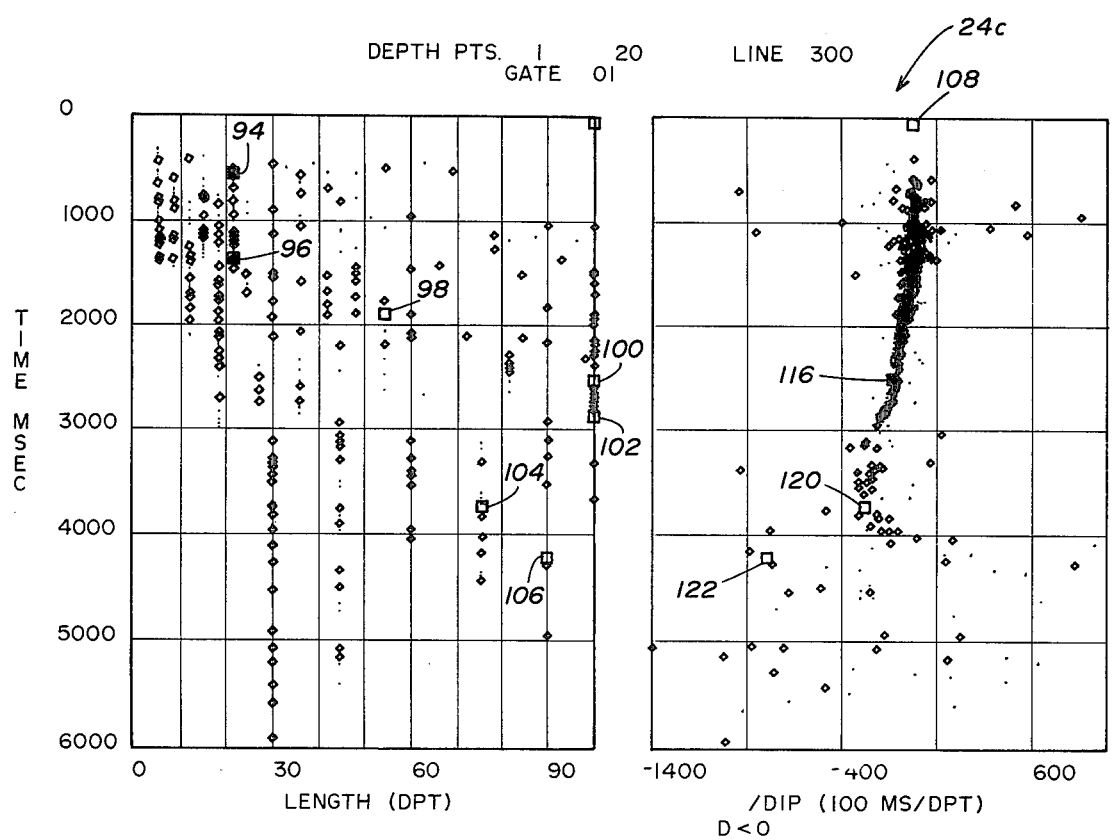

When the operator 10 is satisfied with the displayed results of the Track mode, the operator may then initiate the sort mode of the invention. In this mode, boundaries are defined by the operator on various ones of the parameter display screens 24a–c, and the seismic segments and corresponding parameters are sorted according to the defined boundaries. An example of the definition of a single boundary in the RMS velocity domain is illustrated in FIGS. 5a–c. In order to define a boundary on a selected segment parameter, the operator utilizes the required function keys on the function key set 16 and the stylus 30. Operation of the proper function key electrically divides the data responsive surface 26 into four quadrants. The upper left-hand quadrant of the surface 26 corresponds to the velocity display screen 24a. The upper right-hand quadrant of the surface 26 corresponds to the amplitude parameter display on screen 24b. The lower left-hand quadrant of the surface 26 corresponds to the length parameter display on display screen 24c. The lower right-hand quadrant of the surface 26 corresponds to the dip parameter on display screen 24c.

Thus, if the operator desires to define a boundary on the velocity parameter display, the operator hits the function key entitled Define Upper Boundary and touches the stylus to the upper left-hand quadrant of the data responsive surface 26. At this time, the word ACTIVE becomes illuminated upon the display screen 24a as illustrated in FIG. 5a, and a cursor point becomes illuminated upon the velocity parameter display. The illuminated cursor point is then moved on the display screen 24a as the operator 10 moves the stylus 30, until the cursor reaches the desired first breakpoint 130 on the display screen 24a. At this point, the operator 10 hits a function key button 18 entitled Save Breakpoint.

The operator then moves the stylus 30 until the cursor point reaches a second desired breakpoint 132, at which time the operator hits the Save Breakpoint button. At this time, a dotted boundary line 134 becomes illuminated upon the display screen 24a. The operator continues to move the stylus 30 to define additional breakpoints 136 and 138 and 140 with the cursor, each time hitting the function key button Save Breakpoint.

When the breakpoint 140 is determined, a dotted upper boundary line will thus be illuminated on the RMS velocity display on display screen 24a. An important aspect of the invention is that the operator at any time may alter the upper boundary by hitting the necessary function key buttons and replotting the boundary breakpoints.

If it is desired to define a lower boundary on the RMS velocity display, a Define Lower Boundary function key button is depressed and the stylus 30 moved by the operator 10 to define breakpoints in the manner previously described. In this manner, a lower RMS velocity boundary 142 will be defined on the display screen 24a.

In order to sort the seismic segments and the associated parameters in the space gate being acted upon, the operator 10 hits a Blank function key button. The display screens 24a–c then automatically display indications of which segment and parameter data points meet the conditions of the boundaries. With respect to the seismic segments, only the segments which meet the conditions of the defined boundaries are displayed on display screen 24b in the Accepted display. The segments which fall outside the defined RMS velocity boundaries are displayed in the Rejected display, as illustrated in FIG. 5b.

With respect to the segment parameters, the parameter data which does not meet the boundary conditions remains displayed as dots, while the parameter data which does meet the defined boundaries are displayed as diamond symbols. Thus, as shown in FIG. 5a, each of the RMS velocity points within the boundaries 134 and 142 are displayed with a diamond symbol or a square symbol, the primary parameter data being continuously displayed with the square symbol. Referring to FIG. 5b, each of the amplitude data points corresponding to segments which do not meet the defined RMS velocity boundaries are displayed with a dot, while the amplitude points corresponding to segments which do meet the defined RMS velocity boundaries are defined with diamond symbols. Likewise, referring to FIG. 5c, the length and dip data corresponding to segments which meet the defined RMS velocity boundaries are displayed with diamond symbols, with the length and dip data which do not meet the defined velocity boundaries being displayed as dots.

In this manner, the operator 10 may see at a glance the results of sorting according to the defined RMS velocity boundaries. If the results of the sorting are not satisfactory at this time, the operator through proper operation of the function key set may erase and redefine the RMS velocity boundaries in order to provide a more meaningful sorting operation.

Figure 6A:
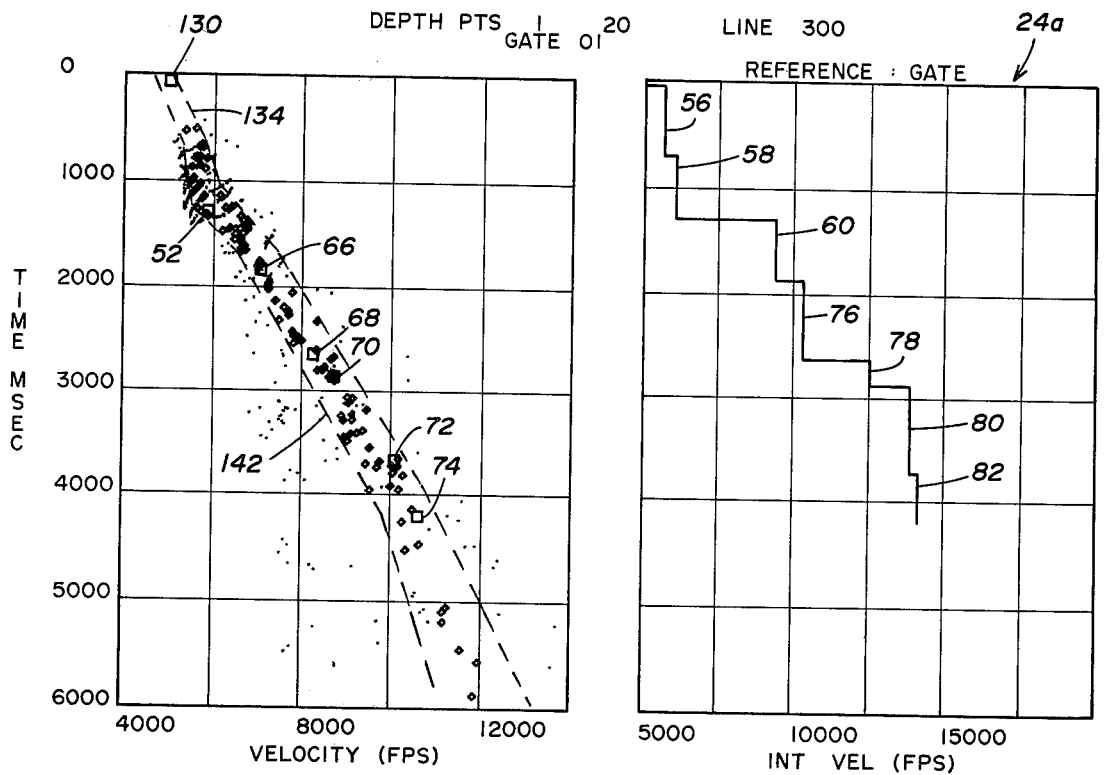
FIGS. 6a-c illustrate the definition of boundaries in the amplitude, length and dip parameters and further illustrate the sorting of the segment parameters according to defined boundaries on the first, second and third screens of the invention.
Figure 6B:
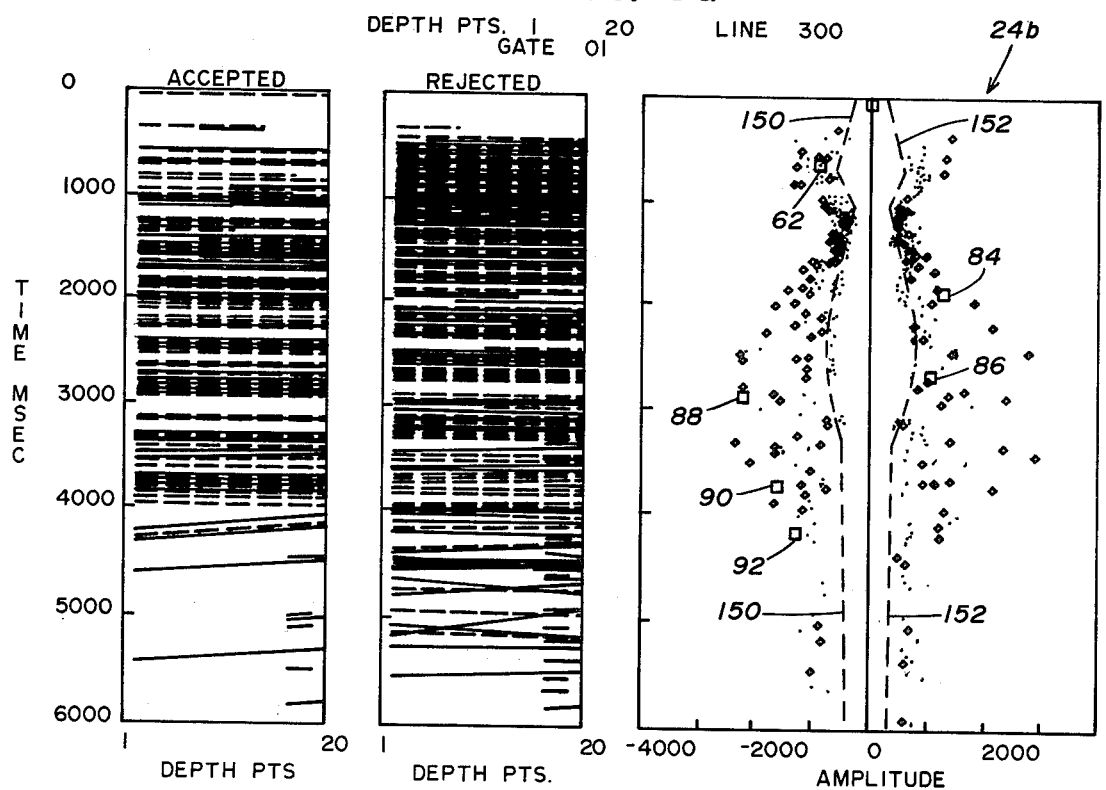
Figure 6C:
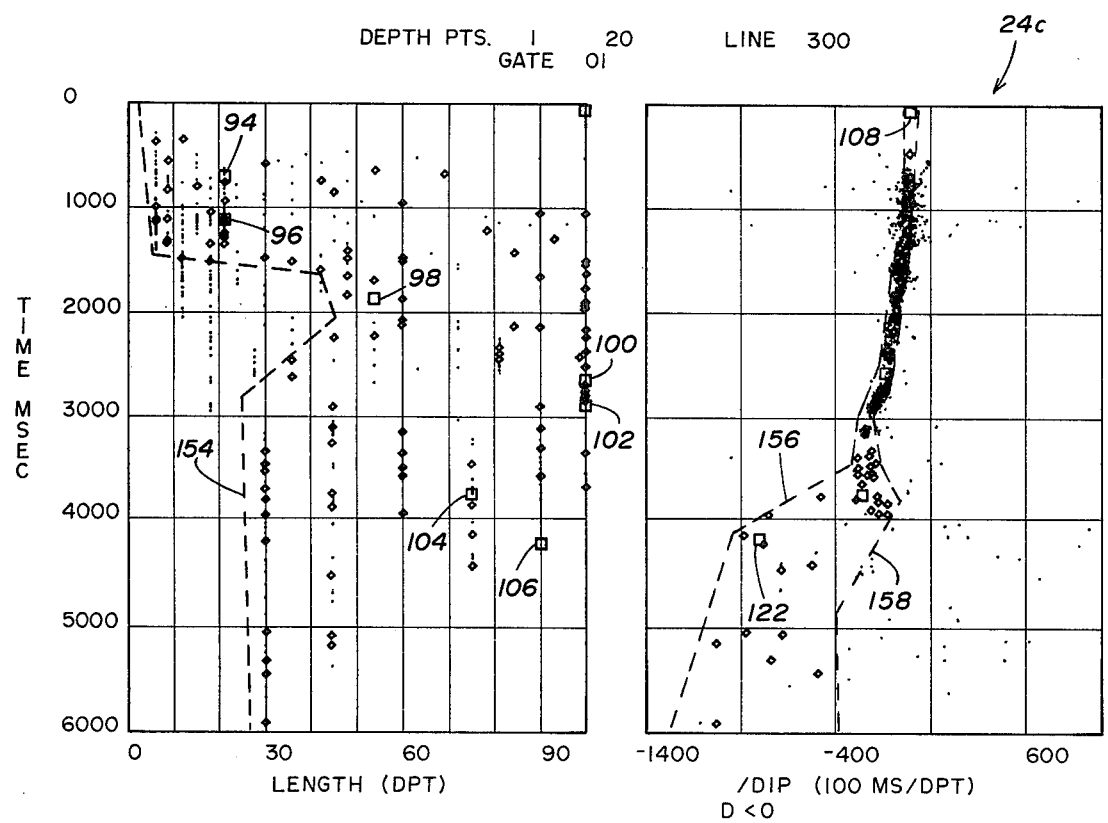

FIGS. 6a–c illustrate the definition of boundaries in amplitude, length and dip domains, and the resulting sorting results. Referring to FIG. 6b, boundaries 150 and 152 have been defined by operation of the stylus 30 and depression of the correct function key by the operator 10. Also referring to FIG. 6c, a lower boundary 154 has been defined in the length domain, and upper and lower boundaries 156 and 158 have been defined in the dip domain on display screen 24c by proper operation of the stylus 30. The operator defines boundaries in a selected one of the parameters by operating the function key set 16 and by touching the stylus 30 to the correct quadrant of the data responsive surface 26 in the manner to be described.

The segment and parameter data in FIGS. 6a–c have also been sorted by the system according to each of the velocity, amplitude, length and dip boundaries. Thus, the diamond symbols in each of the display screens 24a–c represent parameter data which meet all of the defined parameter boundaries. The dots on the display screens represent parameter data which does not meet one or more of the defined parameter boundaries. In addition, the seismic segments shown in the Accepted display on the display screen 24b meet all of the defined parameter values, while the segments shown in the Rejected portion of the display screen 24b fail to meet one or more of the parameter boundaries. Again, any of the boundaries defined by the operator in the velocity, amplitude, length or dip displays may be selectively changed on a real time basis, and thus an extremely accurate representation of statistically meaningful seismic segment information may be quickly obtained by the operator.

Figure 7A:
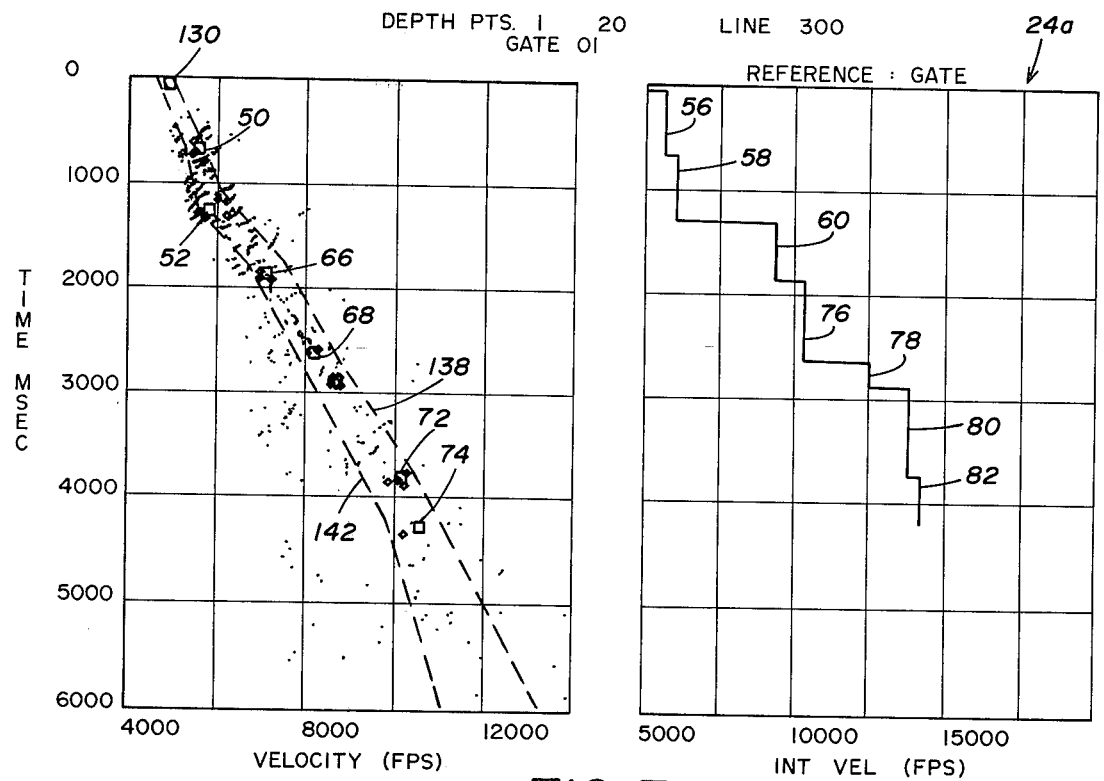
FIGS. 7a-c illustrate the displays on the first, second and third screens of the invention after all segments and corresponding parameters not within a predetermined time range of selected primary segments have been omitted from the display.
Figure 7B:
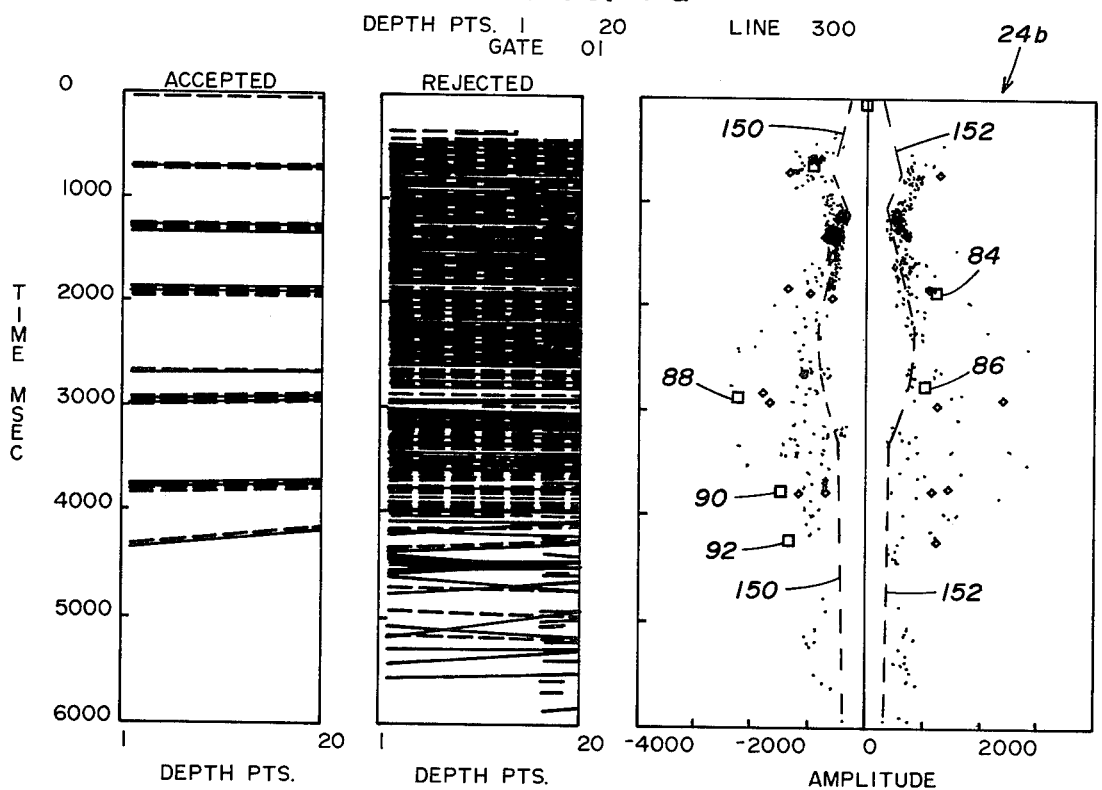
Figure 7C:
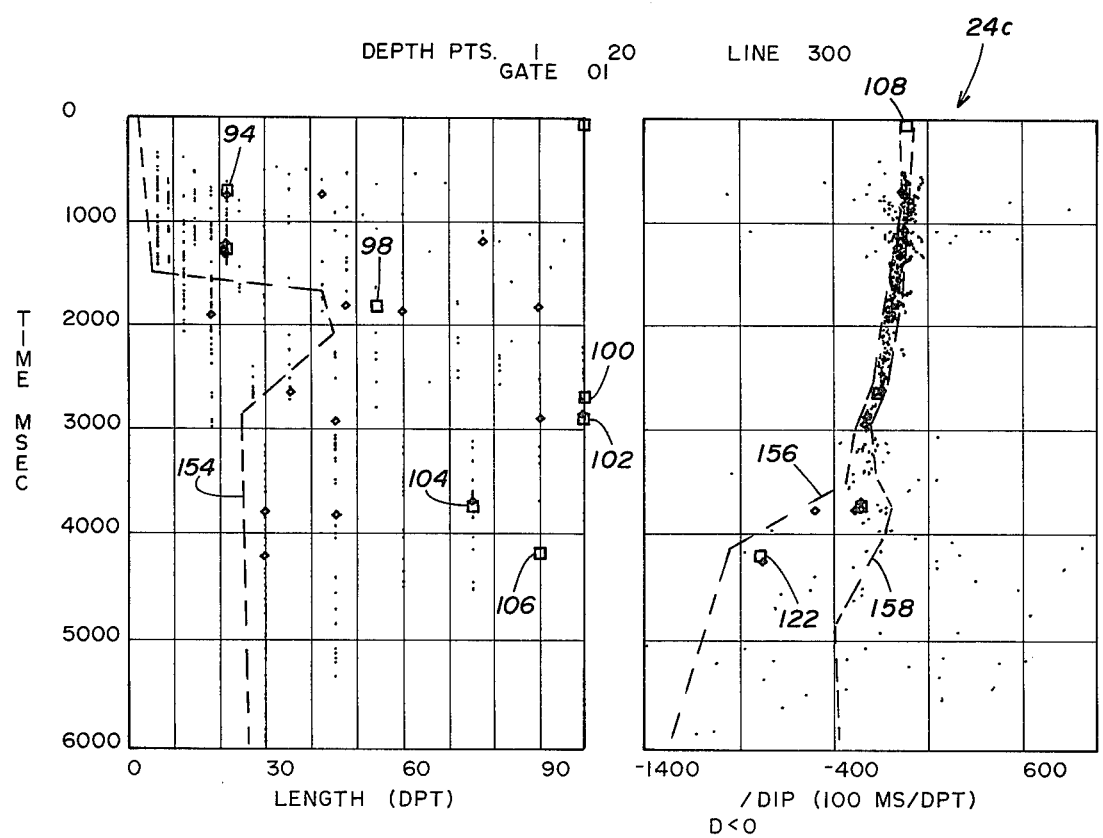

In some instances, it will be desirable for the operator to further operate upon the classified and sorted data displayed on the display screens 24a–c by omitting segment and parameter data which is not positioned within a predetermined time interval from a designated primary segment. In this manner, clutter may be eliminated from the display to provide a more clear illustration of the primary segment data. To perform this function, the Accept Near Primary Segments function key is depressed and all seismic segments and corresponding segment parameters are erased which are not within 50 milliseconds of a designated primary segment. FIGS. 7a–c illustrate the displays on screens 24a–c after such an operation. It may thus be seen that the displays are substantially simplified, thereby providing a check on the gross accuracy of the selected segment primary segments. Specifically, as is shown in FIG. 7b, the Accepted segment display of the display screen 24b now comprises eight distinct primary horizon segments which may be utilized by the operator 10 to make a quick check on the accuracy of the classification and sorting procedure to that time.

Figure 8:
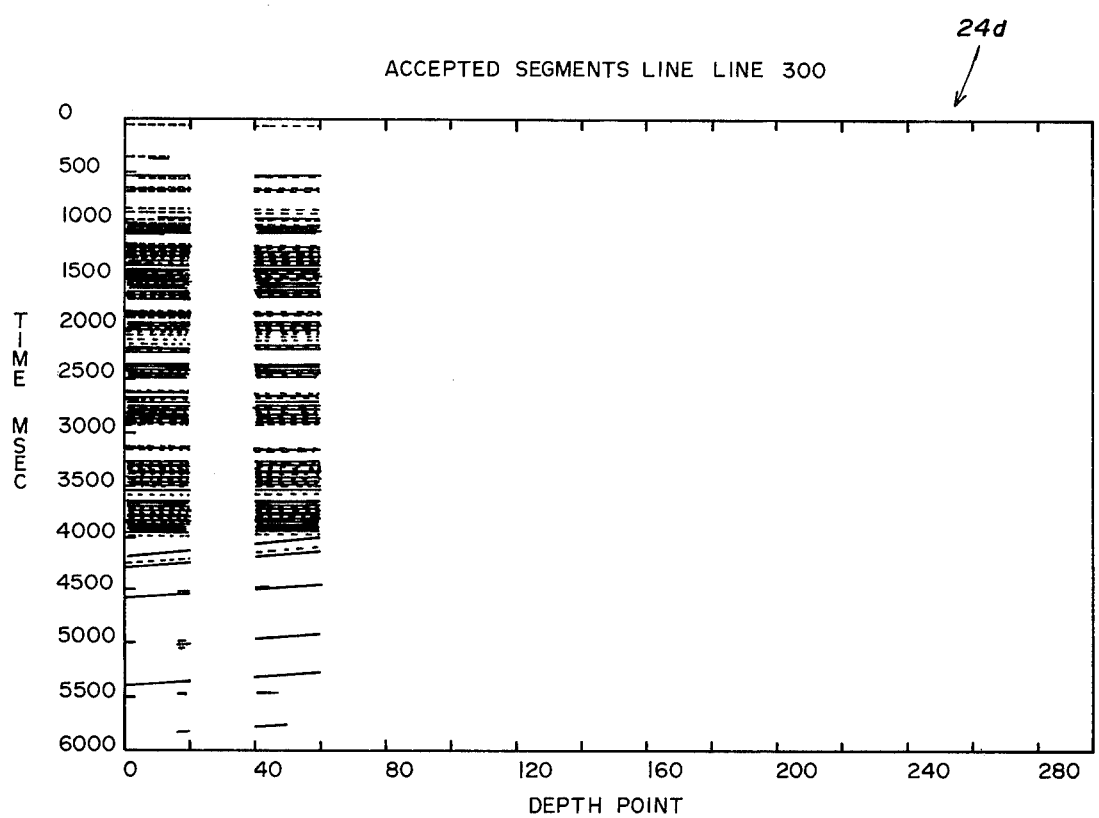
FIG. 8 is a typical display on the fourth screen of the system after two space gates of seismic information have been operated on by the present invention.
Figure 9:
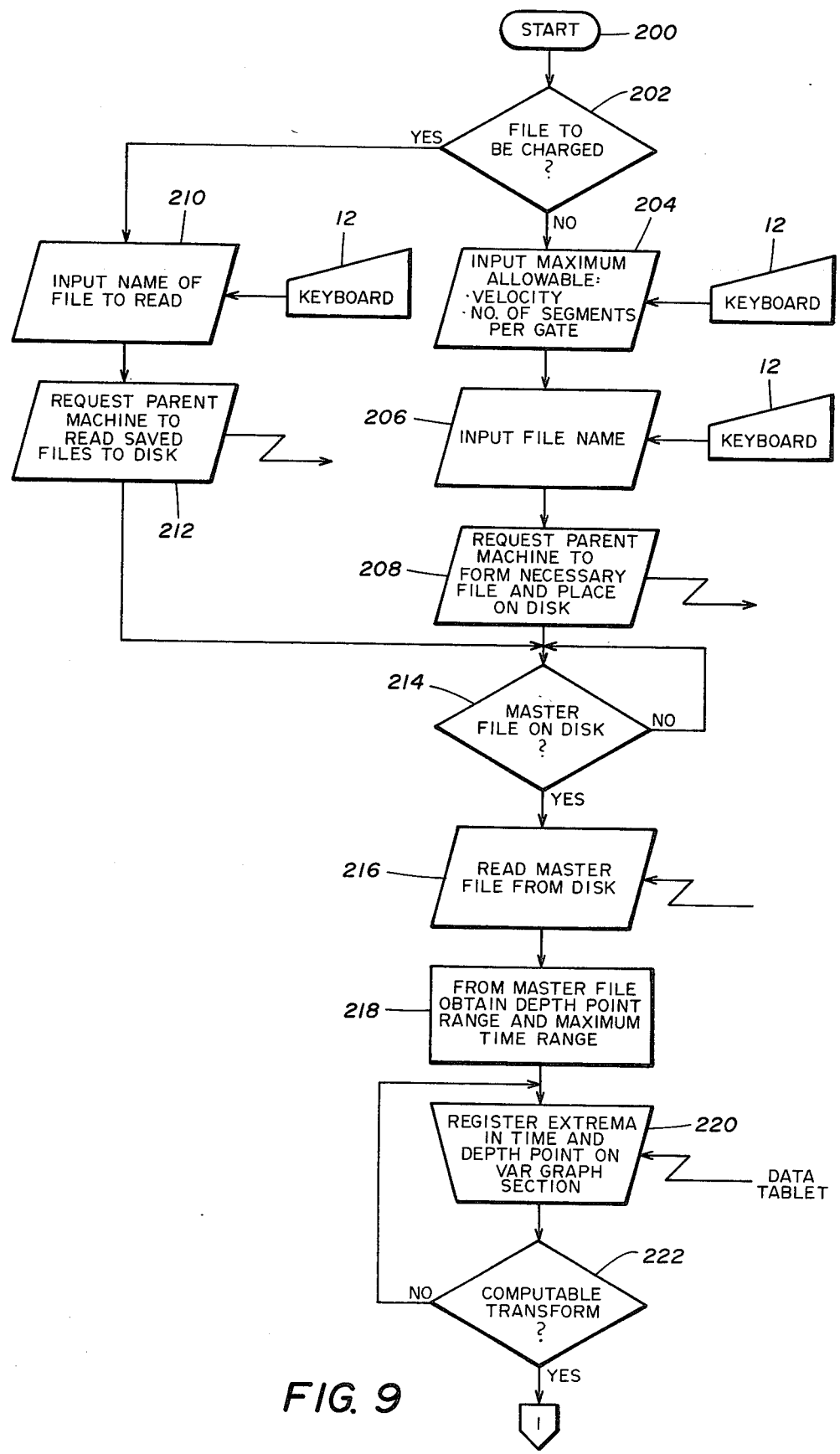

When the operator 10 is satisfied with the displayed segment and parameter data on screens 24a–d for a particular space gate, the accepted seismic segments displayed on screen 24b are transferred to the display screen 24d, and a new set of seismic segments and parameters for the next space gate are displayed on display screens 24a–c. FIG. 8 illustrates the display of the accepted segments of the depthpoints 0–20 in the previously described segment data set. In addition, accepted segments from a space gate between 40–60 depthpoints are shown as a result of additional classification and sorting with the system. As subsequent space gates of segment information are processed, the Accepted seismic segments for those space gates will be displayed on display screen 24d.

After each of the space gates of the graph 28 has been operated upon according to the present system, display screen 24d will accurately depict the accepted primary segment data for the seismic line. The display on display screen 24d will be generally free from the segment anomalies due to picking errors or noise occurring during the data collection phase of the seismic prospecting. Upon completion of operation on the graph 28, the operator may operate the hard copy reproducing machine 20 to obtain a permanent hard copy of the final segment display on screen 24d across the total seismic line being operated upon.

FIGS. 9–16 illustrate functional flow diagrams for accomplishment of the present invention on an 810A SEL digital computer and an 870 TIAC computer. Additional technical information for implementation of the computer program is found in the "Reference Manual SEL810A General Purpose Computer", Number 301-095049-007, published October, 1968, by Systems Engineering Laboratories of 6901 West Sunrise Boulevard, Ft. Lauderdale, Florida, and such publication is incorporated by reference herein. Technical information relative to the formation of output display buffers for use with the display system is found in the "User's Manual Series 400CRT Display System", Bulletin 400M, published July, 1969, by Computek, Inc. of 143 Albany Street, Cambridge, Massachusetts. Technical information required for operation of the 870A computer is described in "TIAC Model 870A Programmers Reference Manual", 1968, Texas Instruments Incorporated.

In the preferred embodiment of the invention, up to thirty space gates for a given seismic line are available to the operator 10. If necessary, this space gate limit may be raised if the need arises. The space sorted gate files are contained in sequential but unique files. An identification file is provided which is a gate reference file containing information about the collective set of gate files. Additionally, this file is used to cross-reference file name against depthpoint at the time the operator requests a given gate. The identification file is a fixed length and the content of the file includes the line name, the minimum and maximum depthpoints for gate files, the number of words in particular gate files, and the minimum and maximum times for the gate files.

Each gate data file contains the time sorted summary file for each segment for gates 1, 2, ... m. The length of these files are variable, depending upon the number of segments contained in a particular gate. The contents of the file include the classification limits of a file, the minimum and maximum depthpoint for each gate, the number of segments in the gate, the I.D. status of each segment, the time, the velocity, the amplitude, the position/length, and the dip.

The data for each seismic segment within a space gate is contained in the form of six word/groups. The specific data in each word of the group is shown in Table I.

TABLE I

1. Identifier: ID (bits 0-15), Identifier
2. Time (msec): 0, Time
3. Velocity (ft/sec): 0, Velocity
4. Segment Status/Amplitude: S, Amplitude; Status
5. Position/Length: P, L; Position, Segment Length
6. Dip (100 × msec/dp): Dip × 100

The segment status of each segment comprises the first three bits of the amplitude word. The lower thirteen bits of the amplitude word is the amplitude of the segment within the gate, with the four bit being a sign bit.

The segment status classification code provided in the three bits of the segment status/amplitude are as follows:

TABLE 1

| S = | Classification Status Codes Interpretation |
|---|---|
| 110 | User has selectively rejected this segment, which would otherwise have been accepted using the classification boundaries for this gate. |
| 111 | This segment has been rejected on the basis of the existing classification boundaries. |
| 000 | Segment is currently unclassified. |
| 001 | Segment has been accepted on the basis of the classification boundaries. |
| 010 | User has selectively accepted this segment which would otherwise have been rejected, using the classification boundaries. |
| 011 | Primary segment. |

FIGS. 9-16 illustrate a functional flow diagram of the operation of the computer 34 of the present invention. Operation of the system is initiated at step 200, and a decision is made at 202 as to whether or not a file is to be charged. It is assumed that prior to initiating operation of the system, the necessary segment and parameter data has been entered on the magnetic disc of the 870 TIAC computer. At 202, the determination is made as to whether or not the file data has been previously furnished on a prior use of the present program. If the file has not been previously used, data is input at 204 by the operator on the keyboard of the teletype 12 to provide the maximum input allowable with respect to velocity and the number of segments per gate. At 206, the file name is input at the keyboard 12 and at 208, the parent 870 TIAC machine is requested to read the data from the magnetic disc into the 810 SEL computer.

If the file to be operated upon has previously been charged, the name of the file to be read is input at 210 from the keyboard of the teletype 12. The parent 870 TIAC machine is requested at 212 to read the files to the disc of the 810 SEL computer.

A decision is made at 214 whether or not the master file is stored upon the disc of the 810 SEL computer. If the answer is no, the decision is reiterated until the master file has been stored upon the 810 SEL computer. At 216, the master file is read from the disc of the 810 SEL computer and the depthpoint range and maximum time range is obtained from the master file at 218. At 220, the extrema in time and depthpoint on the VAR section graph 28 are registered as the operator 10 moves the stylus 30 to the extremes of the graph 28. A decision is made at 222 as to whether or not the coodinates registered by the operator 10 are computable with respect to the transforms within the system. If not, steps 220 and 222 are repeated.

Figure 10:
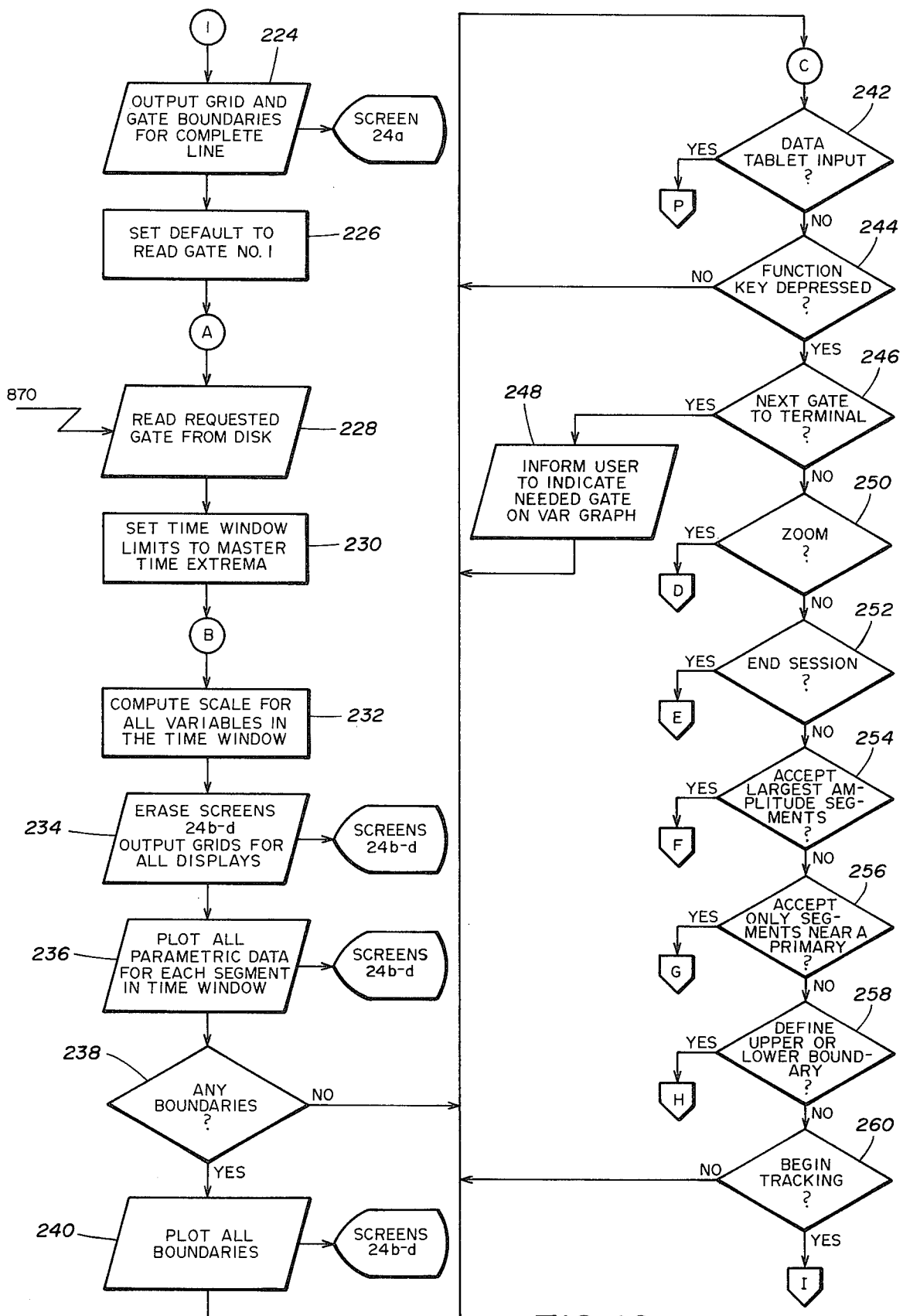

Referring to FIG. 10, the next step occurs at 224, wherein the grid and gate boundaries for a complete line are output on screen 24a. At this point, display screen 24a visually prints out the RMS and interval velocity grids and annotates the coordinates thereof. At 226, the system is set to read the first space gate. After operation on the first space gate in the files, the operator 10 may selectively designate any space gate on the graph 28 for processing. However, to initiate operation of the system, the system automatically reads out the first gate from the 870 computer disc to the 810 computer memory at 228. The time window limits are set at 230 to the master time extrema previously input by the operator into the system. As an example, referring to the previous example, a time range of 0 to 6,000 milliseconds will be input into the system at this time.

The scale is computed at 232 for all the parameter variables in the time window. Also, the scales are adjusted so that the displayed graphs occupy as much screen as possible. For example, the parameter scale for each of the display screens 24a-c are computed at 232. This display screens 24b-d are erased at 234 and the grids are output for each of the display screens 24b-d, along with the desired annotation. All of the parameter data is plotted at 236 for each seismic segment in the time window. A decision is made at 238 as to whether or not the boundaries have previously been determined by the operator. If so, the boundaries are plotted at 240 on the screens 24b-d.

A decision is then made at 242 as to whether or not there has been a data tablet 26 input. Step 242 also occurs if no boundaries have previously been input into the system. If there has been no data tablet input since the last time such a decision has been made at 242, then a decision is made at 244 as to whether or not a function key has been depressed. If not, steps 242 and 244 are reiterated. A decision is made at 246 as to whether or not the function key button entitled Next Gate To Terminal has been depressed. If the button has been depressed, the user is informed by the teletype at 248 to indicate the desired gate on the VAR graph 28.

A decision is made at 250 whether or not the "zoom" function key button has been depressed. If not, a decision is made at 252 as to whether or not the function key button entitled End Session has been depressed. If the answer is negative, the decision is made at 254 as to whether or not the function key button entitled Accept Largest Amplitude Segments has been depressed. If the answer is negative, a decision is made at 256 as to whether or not the function key button entitled Accept Only Segments Near A Primary has been depressed. If the answer is negative, a decision is made at 258 as to whether or not the function key button entitled Define Upper Or Lower Boundaries has been depressed. If the answer is negative, a decision is made at 260 as to whether or not the function key button entitled Begin Tracking has been depressed. If the answer is negative, at 260, steps 242-260 are reiterated.

Figure 11:
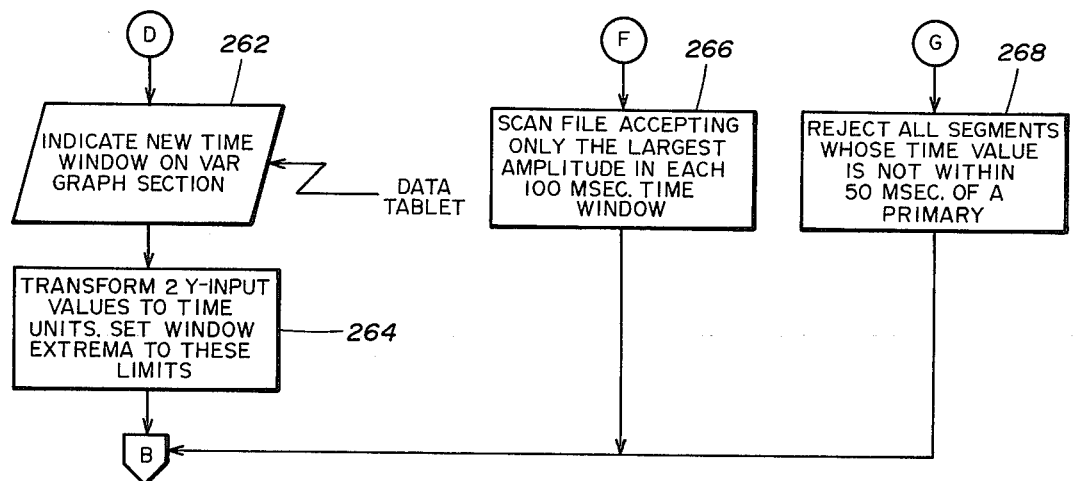

FIG. 11 illustrates the functional steps which occur upon a positive decision at 250 as to whether or not the "zoom" function key button has been depressed. At 262, the operator moves the stylus 30 on the data responsive surface 26 to indicate the desired new time window on the VAR graph 28. At 264, the Y input values are transformed to time units and the window extrema are set into the limits. The new zoomed scales are thus computed at 232 and the new zoom scales are displayed at 234 and 236 as previously described.

FIG. 11 also indicates the functional flow upon a positive decision at 254 as to whether the function key button entitled Accept Largest Amplitude Segments has been depressed. Upon a positive decision at 254, the file is scanned at 266 and only the largest amplitude segment in each 100 millisecond time window is accepted. After the scanning operation, step 232 is repeated.

FIG. 11 also illustrates the steps which occur upon the positive indication that the function key button entitled Accept Only Segments Near A Primary has been depressed. Upon a positive indication at 256, all segments are rejected at 268 whose time values are not within 50 milliseconds of a primary. The steps beginning at 232 are then repeated and a new display is provided. In this manner, the graphs shown in FIGS. 7a–c may be provided.

Figure 12:
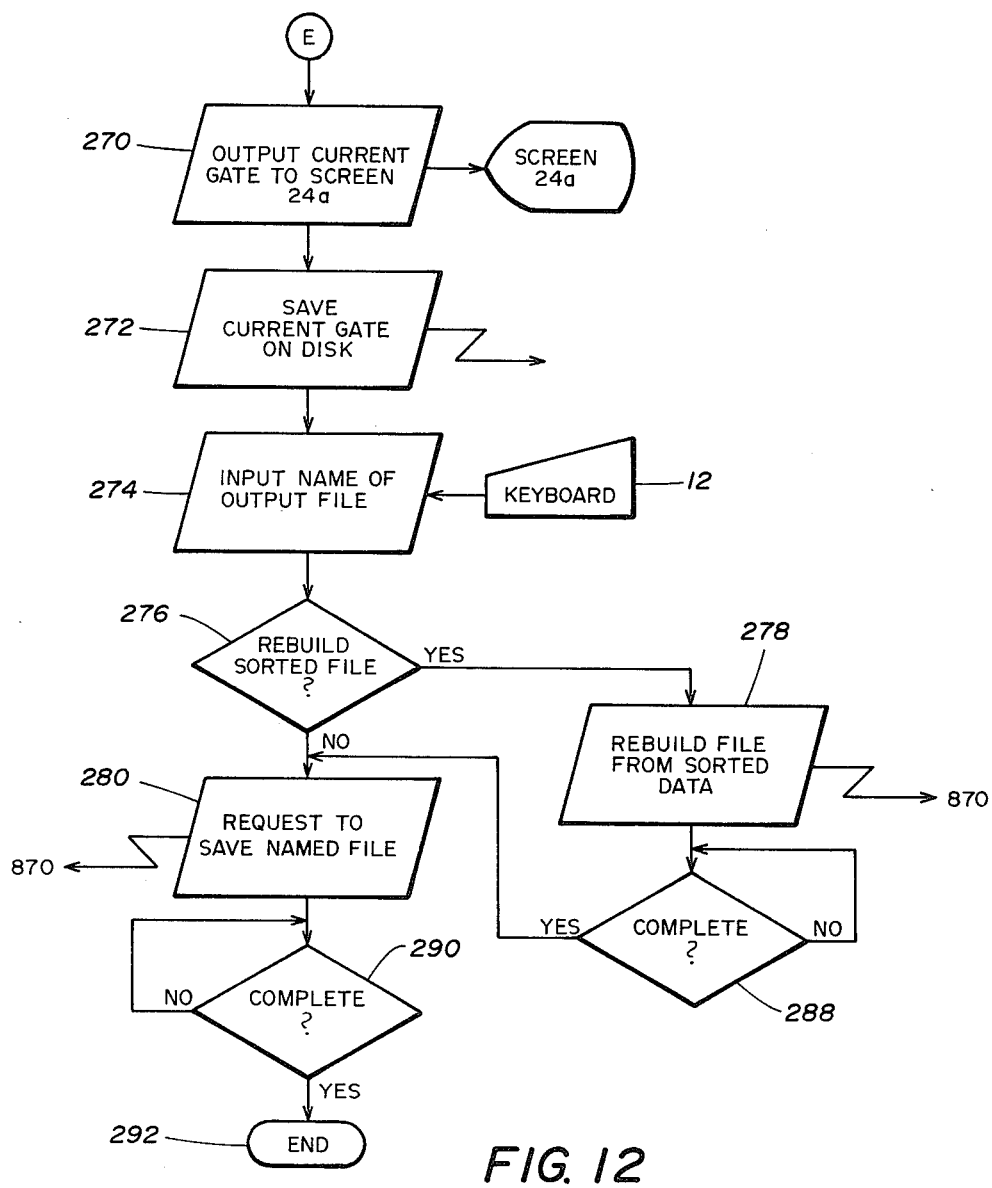

FIG. 12 illustrates the functional steps which occur upon a positive indication that the End Session function key has been depressed at 252. The current gate is output to screen 24a at 270. The current gate on the disc is saved at 272 and the operator operates the keyboard of the teletype 12 to input the name of the output file at 274. A decision is made at 276 as to whether or not the sorted file should be rebuilt. If so, the file is rebuilt at 278 from the sorted data and the file in the 870 computer is updated with all the Accepted seismic segments and all the Rejected seismic segments are thrown away. If the decision is made not to rebuild the sorted file, a request is made by the operator to save the named file and the file is saved on the 870 computer. A decision is made at 282 as to whether or not the rebuilt file is correct, and if so, the step 280 is reiterated. If not, the decision at 288 is reiterated. A decision is made at 290 as to whether or not the operation is complete, and if not, the decision is reiterated. If the file is complete, the program is ended at 292.

Figure 13:
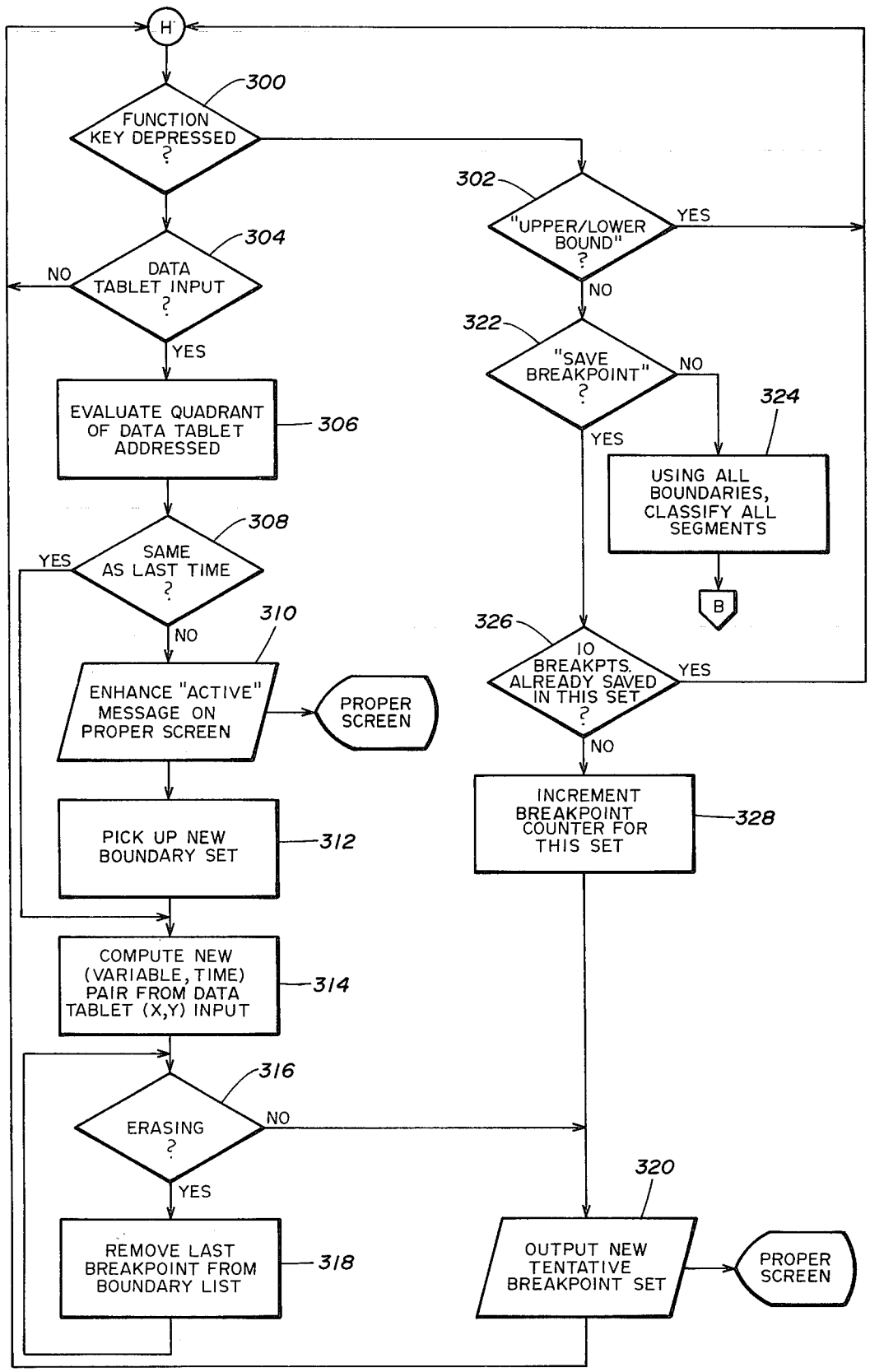

FIG. 13 illustrates the functional operation upon a positive decision at step 258 that the function key button entitled Define Upper Or Lower Boundaries has been depressed. If the function key button is depressed at 300, a decision is made at 302 as to whether the function key button is the Upper/Lower Boundary function key. If the answer is positive, the step 300 is reiterated. A decision is made at 304 as to whether or not a data responsive surface or tablet 26 input is present. If not, step 300 is reiterated. If a data tablet 26 input is present, the quadrant of the data tablet which is being addressed by the operator is evaluated at 306.

As previously noted, the particular quadrant of the data responsive surface 26 being addressed indicates the parameter upon which boundaries will be defined on a particular display screen. A decision is made at 308 as to whether or not the data tablet quadrant being addressed has previously been addressed. If not, the word "ACTIVE" is enhanced on the proper display screen at 310 and a new boundary set is picked up at 312 from the core memory in the 810 computer. This boundary set involves the collection of all the breakpoint times in the other parameters selected by utilizing the stylus 30. If the decision at 308 is positive, or after the picking up of the new boundary set at 312, a new variable and time pair is computed at 314 from the data tablet 26 (X,Y) input.

After the transformation of the coordinates from the data tablet 26 to the parameter coordinates at 314, a decision is made at 316 as to whether or not the operator is erasing. If the answer is yes, the last breakpoint is removed from the boundary list at 318 and step 316 is reiterated. This erasing procedure allows the breakpoint to be eliminated one at a time in dependence upon the point being touched by the operator, in order to allow the boundaries to be selectively erased and redrawn by the operator. If a decision at 316 is negative, a new tentative breakpoint set is output on the proper screen at 320 and step 300 is reiterated.

Upon a negative decision at step 302, a decision is made at 322 as to whether or not the Save Breakpoint function key button has been depressed. If not, all segments are classified at 324, utilizing all the present boundaries which are presently being defined. Step 232 and subsequent steps are then reiterated. In the classification of segment data at 324, the files stored within the computer memory are examined and all data outside the defined boundaries are classified as Rejects. All data inside the defined boundaries are classified as Accepts and are thus displayed on proper screens. The Rejected parameters are displayed with the dot symbols and the Accepted parameters are displayed with the diamond symbols. The interval velocity display is not changed by this classification.

If the decision at 322 is positive, a decision is made at 326 as to whether or not ten breakpoints have already been saves in this set. In the preferred embodiment of the invention, the system has the capacity to save only ten breakpoints. Of course in a larger system, additional breakpoints could be saved. If ten breakpoints have previously been saved in a set, step 300 is reiterated. If the decision at 326 is negative, the breakpoint counter is incremented at 328 for the particular data set and then step 320 is reiterated.

Figure 14:
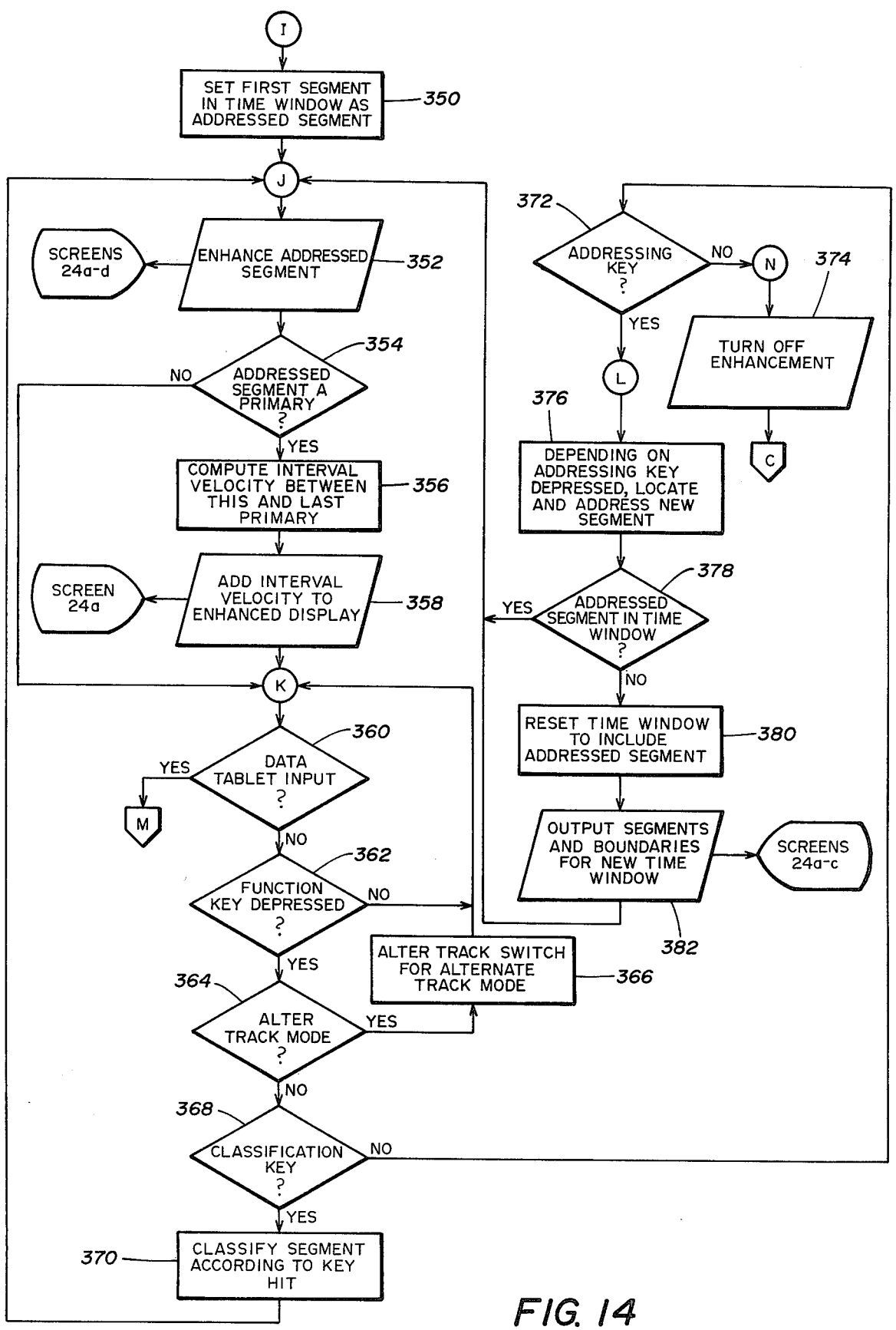

FIG. 14 illustrates the functional steps which occur upon a positive decision at 260 that the Begin Tracking function key button has been depressed. The first seismic segment is set in the time window as an addressed segment at 350. This addressed segment is enhanced at 352 on screens 24a-d to indicate that the particular segment is presently being tracked by the operator. A decision is made at 354 as to whether or not the segment has previously been classified as a primary. If it has, the interval velocity between the segment and the last primary segment is computed at 356 according to well-known Equation 1 previously noted. At 358, the computed interval velocity is added to the enhanced display on screen 24a.

If the decision at 354 is negative, or after the completion of step 358, a decision is made at 360 as to whether or not there is a data table 26 input. If the answer is yes, the program proceeds to the steps which will be subsequently described in FIG. 15. If the answer is negative, a decision is made at 362 as to whether or not a function key button has been depressed. If not, the decision at 360 is reiterated. If yes, a decision is made at 364 as to whether or not the operator desires to alter the Track mode.

The system provides three different Track modes to track the seismic segments. First, the first seismic segment in a time window which has previously been "zoomed" may be enhanced and the function keys may be utilized to jump to the next seismic segment or back to the previous seismic segment. Second, the operator may move the stylus 30 relative to the VAR graph 28 to enhance the seismic segment closest to the tip of the stylus 30. Third, the operator may select one of the quadrants of the data responsive surface 26 to selectively enhance a seismic segment on a selected display screen. At 366, the proper track switch is actuated to provide the alternative track mode desired and steps 360 and subsequent steps are reiterated.

A decision is then also made whether or not the classification function key button has been depressed at 368. If so, the seismic segment presently being enhanced is classified at 370 according to the particular function key hit. Steps 352 and subsequent steps are then reiterated. This allows the operator 10 to provide a predetermined classification to a segment as Accepted or Rejected. If the classification key has not been hit at 368, the decision is made as to whether or not the Addressing function key has been hit at 372. If not, the enhancement of the particular display screen in turned off at 374 and step 242 is reiterated. If the Addressing key has been depressed, a new seismic segment is located and addressed at 376, depending upon which Addressing key is depressed. This enables the seismic segments to be located during the tracking mode according to the operator's operation of the function key set 16.

A decision is made at 378 as to whether the addressed segment is in the time window. If the answer is yes, step 352 and subsequent steps are reiterated. If the answer is negative, the time window is automatically reset by the system at 380 to include the addressed segment. This is the fearture of the invention which enables the zoomed display to be automatically advanced to include additional addressed segments which fall outside the zoomed time scale. At 382, the segments and boundaries for the new time window are output on the screens 24a-c and step 352 and subsequent steps are reiterated.

FIG. 15 illustrates the steps which occur after a positive indication of the decision at 360 as to whether or not a data input is present. The decision is made at 400 as to whether or not the system is tracking with the time scale. If the answer is yes, the operator is utilizing the entire VAR graph 28 for the Tracking mode, and the data tablet Y input is transformed at 402 into time units. The file is scanned at 404 for the segment times closest to the input times, and the segment closest to the corresponding segment is addressed. Steps 376 and subsequent steps are then reiterated.

If the answer at 400 is negative, the quadrants of the data tablet 26 are being utilized in the Tracking mode and the X input is transformed to the proper units at 406, depending upon which quadrant of the data tablet 26 is being contacted by the stylus 30. The Y input is transformed at the time units at 408 and the file is scanned at 410. A decision is made at 412 as to whether or any segment parameters corresponding to the input values are found. If the answer is yes, step 352 and subsequent steps are reiterated to enhance the address segment. If the decision at 412 is negative, the enhancement is turned off at 414 on the screens 24a–c and steps 360 and subsequent steps are reiterated.

FIG. 16 illustrates the steps taken upon a positive decision at 242 as to whether or not a data tablet 26 input has been made. A decision is made at 450 as to whether or not a new gate is being addressed. If not, step 242 and subsequent steps are repeated. If a new gate is being addressed, the accepted segments for the particular gate are output at 452. Interval velocities are output at this step for primary segments on screen 24a. At 454, the resident gate is output to the 870 computer disc memory. The X input is transformed at 456 and the requested gate number is evaluated in the master file, utilizing the determined breakpoint. A decision is made at 458 as to whether or not to complete the classifications. If the decision is positive, a request is made at 462 to the 870 computer to complete classification, and the determined classification is placed on all future space gates. Thus, new segments having these same identifiers as the classified seismic segments take on the classification provided the last time the particular seismic segment was classified. This provides a guideline to the operator to eliminate continuous classification of identical segments. This operation is at the option of the operator. A decision is made at 462 as to whether or not the classification is complete, and if not, 462 is reiterated. After the classification is complete, or if no classification is desired, steps 228 and subsequent steps are repeated.

It may thus be seen that the present invention provides a system for operating upon seismic data which substantially improves the accuracy of classifying and sorting seismic segments. An important aspect of the invention is that the multidimensional sorting of the invention is done on a substantially real time basis, with the operator being able to define sorting boundaries in up to four independent parameter dimensions. An additional important aspect of the invention is the ability of the operator to address the segment in any of the four parameter dimensions through the use of the partitioned data table, in addition to the ability to zoom or expand the parameter and segment displays about any area the operator indicates with the data tablet and the associated stylus. The present system and method provides a technique with wide capabilities to enable an operator to quickly provide an accurate representation of the subsurface geology by eliminating seismic segments with anomalous parameter values.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for interpreting seismic segment data comprising:
   means for displaying seismic segments within a space gate,
   means for displaying parameters of said seismic segments including the RMS velocity as a function of time,
   means for designating ones of said segments as primary seismic segments, and
   means for automatically computing and displaying the interval velocities of said primary seismic segments.

2. The system of claim 1 wherein said designating means comprises:
   a data responsive surface for receiving a graph of seismic segments corresponding to the displayed seismic segments,
   a stylus for being moved adjacent said surface, and
   means associated with said surface and said stylus for generating electrical signals representative of the location of said stylus relative to said surface.

3. The system of claim 1 wherein said parameters include wavelet amplitude, dip, and segment length, and wherein the parameter data of said primary seismic segments are displayed with different symbolism than the remainder of said parameter data.

4. The system of claim 1 and further comprising:
   means for defining parameter boundaries on said displaying means, and
   means for indicating on said displaying means which of said parameters meet the boundary conditions.

5. The system of claim 1 and further comprising:
   zoom means enlarging the display of a selected portion of said seismic segments and corresponding parameters.

6. A system for interpreting seismic segment data comprising:
   a plurality of display screens arranged for viewing by an operator,
   means for energizing one of said display screens to display a representation of seismic within a selected space gate,
   means for energizing said display screens to display data representative of a plurality of parameters of said seismic segments,
   means operable by the operator for displaying selected parameter boundaries on ones of said display screens, and
   means for identifying which of said seismic segments and said parameter data meet the conditions of all of said parameter boundaries.

7. The system of claim 6 wherein the seismic segments which meet the parameter boundaries are displayed separate from the seismic segments which do not meet the parameter boundaries.

8. The system of claim 6 wherein the parameter data which meets the conditions of the parameter boundaries is displayed with a different symbolism than the parameter data outside the parameter boundaries.

9. The syste of claim 6 wherein said parameters include wavelet amplitudes.

10. The system of claim 6 wherein said parameters include dip.

11. The system of claim 6 wherein said parameters include segment length.

12. The system of claim 6 wherein said parameters include RMS velocity.

13. The system of claim 6 wherein said seismic segments are displayed with solid display lines being representative of segment peaks and with dashed display lines being representative of segment troughs.

14. The system of claim 6 and further comprising: means for varying said parameter boundaries.

15. A system for processing seismic segment data comprising:
a data responsive surface for receiving a graph of segment data over a plurality of space gates,
a stylus movable by an operator relative to said surface for generation of electrical signals indicative of the position of said stylus on said surface,
a plurality of displays for displaying to the operator representations of segments within a selected one of said space gates and a plurality of parameters of said segments,
means responsive to positioning of said stylus for defining on said displays boundaries for selected ones of said parameters, and
means for indicating on said displays which of said segments and parameters meet the conditions of said boundaries.

16. The system of claim 15 wherein said data responsive surface is divided into a plurality of areas each corresponding to one of said parameter displays, and
means responsive to positioning of said stylus on one of said areas for defining a boundary on the respective parameter display.

17. The system of claim 15 and further comprising: zoom means for enlarging the display of selected portions of said segments and said parameters.

18. The system of claim 15 wherein said parameters comprise dip, amplitude, velocity and length.

19. The system of claim 15 and further comprising:
means responsive to positioning of said stylus adjacent a segment for designating the segment as a primary segment and for displaying the interval velocity of the segment.

20. A system for interacting with an operator to sort and classify seismic segment data comprising:
a data responsive surface for receiving a graph of seismic segment data on time-depthpoint coordinates,
a stylus movable by the operator adjacent said graph,
means associated with said data responsive surface and said stylus for generating electrical signals representative of the location of said stylus to said graph,
a plurality of display screens arranged for viewing by the operator,
an automatic data processing machine interconnected between said stylus, data responsive surface and display screens,
means operable by the operator to display on said display screens representations of seismic segments within a selected space gate of said graph and representations of the velocity, amplitude, length, and dip parameters of said seismic segments within the selected space gate,
classification means responsive to movement of said stylus relative to said graph for displaying on said display screens indications of primary horizons,
means responsive to movement of said stylus relative to said graph for displaying boundaries on selected ones of the displayed parameters of said seismic segments, and
means for initiating operation of said automatic data processing machine to sort the seismic segments and seismic parameters according to said boundaries and for displaying on said display screens which of said seismic segments and parameters meet the conditions of said boundaries.

21. The system of claim 20 wherein a plurality of space gates of said graph are operated upon by the system and further comprising:
a display screen for displaying on time-depthpoint coordinates the seismic segments for all space gates which meet the conditions of said boundaries.

22. The system of claim 20 and further comprising:
means for enlarging the display of selected portions of said seismic segments and parameters.

23. The system of claim 20 wherein said seismic segments are displayed by solid lines representative of peaks and by broken lines representative of troughs.

24. The system of claim 20 and further comprising:
means for omitting display of seismic segments not within a predetermined time interval of said primary horizons.

* * * * *